United States Patent
Isomura

[19]

[11] Patent Number: 6,055,273
[45] Date of Patent: Apr. 25, 2000

[54] DATA ENCODING AND DECODING METHOD AND DEVICE OF A MULTIPLE-VALUED INFORMATION SOURCE

[75] Inventor: Masakazu Isomura, Suwa, Japan

[73] Assignee: Seiko Epson Corporation, Tokyo, Japan

[21] Appl. No.: 08/921,053

[22] Filed: Aug. 29, 1997

[30] Foreign Application Priority Data

Sep. 2, 1996 [JP] Japan .................................. 8-232324

[51] Int. Cl.[7] ...................................................... H04B 1/66
[52] U.S. Cl. ...................... 375/240; 341/107; 358/261.2; 358/430; 382/247
[58] Field of Search .................................... 375/240, 241, 375/246, 250, 264, 286; 341/106, 107; 348/472; 358/261.1, 261.2, 426, 429, 430, 432, 433; 382/238, 245, 246, 247

[56] References Cited

U.S. PATENT DOCUMENTS

| | | | |
|---|---|---|---|
| 3,813,485 | 5/1974 | Arps | 358/261.2 |
| 4,425,582 | 1/1984 | Kadakia et al. | 358/430 |
| 5,021,891 | 6/1991 | Lee | 358/432 |
| 5,091,977 | 2/1992 | Katata et al. | 382/238 |
| 5,214,502 | 5/1993 | Stone et al. | 348/472 |
| 5,453,843 | 9/1995 | Levy | 358/426 |
| 5,577,132 | 11/1996 | Yokose et al. | 382/238 |
| 5,881,173 | 3/1999 | Ohmori | 382/232 |

OTHER PUBLICATIONS

International Standard ISO/IEC 11544—CCITT Rec. T.82 (1993 E) pp., 26–43.
U.S. Patent application Serial No. 08/544,945, filed Oct. 18, 1995, Akihiko Yajima, Image Data Encoder/Decoder System and Method.
$7^{th}$ & $8^{th}$ Chapters of "Compression of Images Information" (Ohm. Co.).

Primary Examiner—Stephen Chin
Assistant Examiner—Chieh M. Fan
Attorney, Agent, or Firm—Oliff & Berridge, PLC

[57] ABSTRACT

A data encoding method of a multiple-valued information source in accordance with the present invention includes a prediction setting process which divides a multiple-valued information source into bit planes or level planes, defines either "0" or "1" of the plane as a superior symbol and the other as an inferior symbol, and predicting the superior symbol to continue for n units, and sets the n units as a prediction bit number run, and a prediction result output process which outputs either signal of "0" or "1" as a prediction correct signal as a code word, when prediction is correct for an observed series that includes the prediction bit number input, and moves to the operation of encoding the next string of n bits, or outputs the other of either "0" or "1" as a prediction failed signal as a code word, when the prediction has failed in the encoding operation. A similar prediction setting process and prediction result output process are recursively iterated, setting a newly-decreased prediction bit number as a prediction bit number less than n units when the prediction has failed a specified number of times.

24 Claims, 17 Drawing Sheets

COMPARISON WITH QM CODER
(COMPRESSION PERCENTAGE/CODING TIME)

|  | SIZE (BYTE) | QM=CODER | THE PRESENT INVENTION |
|---|---|---|---|
| FILE A | 13950 | 7.7%/6.61s | 7.2%/2.22s |
| FILE B | 13950 | 40.0%/6.94s | 39.5%/2.69s |
| FILE C | 13950 | 55.8%/7.36s | 56.4%/2.42s |
| FILE D | 13950 | 77.1%/7.79s | 77.1%/3.30s |

FIG.7

```
INPUT SYMBOLS  0   1   4   9  23  60 224   0   3  . . .
               ─────────────────────────────────────────
               0   1   0   1   1   0   0   0   1  . . .
               0   0   0   0   1   0   0   0   1  . . .
               0   0   1   0   1   1   0   0   0  . . .
               0   0   0   1   0   1   0   0   0  . . .
               0   0   0   0   1   1   0   0   0  . . .
  HIGHER       0   0   0   0   0   1   1   0   0  . . .
   BITS        0   0   0   0   0   0   1   0   0  . . .
               0   0   0   0   0   0   1   0   0  . . .
```

FIG. 12

GROUP NUMBERS AND ADDITIONAL BITS

| INPUT SYMBOL | GROUP NUMBER | NUMBER OF ADDITIONAL BITS |
|---|---|---|
| 0 | 0 | 0 |
| 1 | 1 | 0 |
| 2,3 | 2 | 1 |
| 4,5,6,7 | 3 | 2 |
| 8~15 | 4 | 3 |
| 16~31 | 5 | 4 |
| 32~63 | 6 | 5 |
| 64~127 | 7 | 6 |
| 127~255 | 8 | 7 |

FIG. 13

| GROUP NUMBER \ INPUT SYMBOL | 0 | 1 | 4 | 9 | 23 | 60 | 224 | 0 | 3 |
|---|---|---|---|---|---|---|---|---|---|
| 0 | 0 | 1 | 1 | 1 | 1 | 1 | 1 | 0 | 1 |
| 1 | – | 0 | 1 | 1 | 1 | 1 | 1 | – | 1 |
| 2 | – | – | 1 | 1 | 1 | 1 | 1 | – | 0 |
| 3 | – | – | 0 | 1 | 1 | 1 | 1 | – | – |
| 4 | – | – | – | 0 | 1 | 1 | 1 | – | – |
| 5 | – | – | – | – | 0 | 1 | 1 | – | – |
| 6 | – | – | – | – | – | 0 | 1 | – | – |
| 7 | – | – | – | – | – | – | 1 | – | – |

DATA ENCODING AND DECODING METHOD AND DEVICE OF A MULTIPLE-VALUED INFORMATION SOURCE

BACKGROUND OF THE INVENTION

1. Field of Invention

The invention relates to a data encoding method and device for compressing a multiple-valued information source, and a data decoding method and device for decompressing (decoding) a compressed multiple-valued information source. Specifically, it relates to a method and device for converting a multiple-valued information source into a binary bit series and compressing that binary bit series or coding that binary bit series.

2. Description of Related Art

Conventionally, arithmetic encoding methods which handle binary information consisting of "0"s and "1"s are known in the world of information theory. The conventional arithmetic encoding method is an entropy encoding method and it has the property of being intrinsically reversible (lossless). Also, the principle behind this method has been incorporated into an ideal encoding method for memoryless information sources known as Elias encoding. Specifically, in arithmetic encoding, the corresponding segments of "0"s and "1"s are divided into unequal lengths corresponding to the probability of each symbol occurring, and a target symbol series is assigned to each partial segment. The coordinates of the points included within the segment obtained by recursive iteration of division are encoded as represented by binary points capable of being divided into at least another segment.

In the arithmetic encoding method, as compared with block encoding, which makes specific code words correspond to information source symbols having finite items, the specification of the encoder has advantages such as utilizing minimal memory and hardware capable of high-efficiency and suitable encoding. Through these advantages, this arithmetic encoding method can compress information to a level nearest to the entropy of the information. In the field of information theory and handling of binary signals, this is considered the best and most efficient encoding method. Moreover, this arithmetic encoding method is particularly suitable for encoding Markov information sources.

The following conventional arithmetic encoding methods have been proposed: a Q coder, an arithmetic-type MEL coder, a mini-max coder and an arithmetic coder of multi-value. Also known conventionally is an improvement of these arithmetic encoding methods referred to as a QM encoder. The QM coder is commonly used in the following two standards: the color still picture encoding standard (JPEG); and the binary image encoding standard (JBIG). This encoder is used in encoding binary information sources, and when encoding a multiple-valued information source such as in JPEG, preprocessing is necessary for converting the multiple-valued information source into binary. In this case, the number of binary symbols to be encoded increases, but it becomes possible to convert to a binary series without increasing the amount of information asia multiple-valued information source.

The design of the QM coder is explained in detail in the regulations of JPEG and JBIG. However, for comparison with the present invention, which is described in detail later, a schematic of the QM coder is explained below and shown in FIG. 18. Because the configuration of an arithmetic-type entropy decoder is substantially identical to the configuration of an entropy decoder, its explanation is omitted here.

The QM coder 101, which serves as the arithmetic-type entropy encoder, is configured to include an arithmetic calculator 102 and an occurrence probability generating mechanism 103 to function as a status register. A state parameter table is written within the occurrence probability generating mechanism 103, which is required for determining the occurrence probabilities of the symbols required for encoding. The above-mentioned state parameters are specified by input status signals 106. Also, with regard to the status parameter table specified by the status signals 106, the arithmetic calculator 102 outputs data during the update of calculated parameters as a readout address, and data of the occurrence probability generating mechanism 103, specified by the readout address, is output to the arithmetic calculator 102. The arithmetic calculator 102 compresses input data 104 based on data input in this manner, encodes it and outputs it. Moreover, the status signals 106 are input into the occurrence probability generating mechanism 103. This is, for example, reference pixel data sought by a mechanism such as that referred to as a Markov model, and it is a signal used when raising the compression rate.

The operation of a QM coder configured in this manner is explained based on the flow chart of FIG. 19. First, a value 0xFFFF is assigned to register A in the QM coder 101 and a value 0x0000 is assigned to register C. Also, an index ST is initialized for estimating probability (step S100). Next, a coding target symbol (1 bit) is input (step S101). Also, the acquired symbol is determined to be a superior symbol or an inferior symbol (step S102). When it is a superior symbol, the process advances to step S103, and when it is an inferior symbol, the process advances to step S106.

The occurrence probability of an inferior symbol is obtained by referring to a probability estimate table LSZ according to the index ST. Furthermore, the occurrence probability of the superior symbol is obtained by subtracting that from register A and assigning that value to register A (step S103). Subsequently, it is checked as to whether the highest bit of register A is "1" (step S104). If it is "1", the process advances to step S105, and if it is "0", the process advances to step S114. Also, when it is "1", the index ST for encoding the next symbol is obtained by referring to a probability estimate table NMPS according to the index ST (step S105).

In step S102, when it is an inferior symbol, the occurrence probability of the inferior symbol can be obtained by referring to the probability estimate table LSZ according to the index ST, and the value of this occurrence probability is assigned to register A (step S106). Subsequently, the value of register A is added to register C (step S107). Also, by referring to the probability estimate table SWITCH, according to the index ST (step S108), when this is a "1", the process advances to step S109, and the superior symbol is updated.

However, in step S110, index ST is sought for encoding the next symbol by referring to the probability estimate table NLPS according to the index ST. Also, in step S111, both register A and register C shift one bit to the left. Due to this left shift, the highest bit that has overflowed from register C is output as a code word (step S112). Also, in step S113, it is checked as to whether the highest bit of register A is "1". When it is a "1", the process returns to step S111 and repeats the left shift. When the highest bit is "0", the process advances to step S114, and the process ends if the encoded symbol is the final symbol. If it is not, the process returns to step Through this method, the QM coder compresses and encodes the binary bit series being input by using the probability estimate tables LSZ, NMPS, and NLPS.

SUMMARY OF THE INVENTION

In order to achieve the object of this invention, the data encoding method of a multiple-valued information source includes a prediction setting process defining either "0" or "1" as a superior symbol and the other as an inferior symbol, when a multiple-valued information source that includes a plurality of bits is divided into bit planes and a binary bit string that includes "0"s and "1"s of each bit plane is input, predicting the superior symbol to continue for n units, and setting that n units as a prediction bit number; and a prediction result output process outputting either signal of "0" or "1" as a prediction correct signal, being a code word, when prediction is correct for an observed series composed of the above-mentioned prediction bit number input, and moving to the operation of encoding the next string of n bits, and outputting the other of either "1" or "1" as a prediction failed signal, as a code word, when the prediction has failed in the encoding operation; wherein a similar prediction setting process and prediction result output process are recursively iterated, setting a newly-decreased prediction bit number as a prediction bit number less than n units when the prediction has failed a specified number of times.

Thus, when a multiple-valued information source is divided into bit planes and the superior symbol of each bit plane is predicted to continue for n units, and when the prediction was correct, the n bits become represented by a single prediction correct signal, and the speed of encoding is increased in addition to increasing the efficiency of compression. Moreover, when the prediction has failed because the next prediction is performed by reducing the number of prediction bits, the efficiency of compression and speed of encoding is not reduced very much, even when the prediction fails.

Also, a further object of the invention is to provide a data encoding method of a multiple-valued information source, wherein the n units is an even number; the observed series is halved when the prediction has failed for a specified number of times; the newly-decreased prediction bit number is made one half of the prediction bit number when an inferior symbol exists only in the former half of the halved observed series; and the newly-decreased prediction bit number is made one fourth of the prediction bit number when an inferior symbol exists only in the latter half of the halved observed series.

Generally, when an inferior symbol exists in the latter half of the observed series, one level more of inferior symbols often exists in the next observed series. However, the invention as defined can adapt to such a condition, and the speed and efficiency of encoding can be increased.

A further object of the invention is to provide a data encoding method of a multiple-valued information source, wherein, when the newly-decreased prediction bit number becomes 1 and when that bit is an inferior symbol, encoding is performed in subsequent encoding by setting the original inferior symbol as the superior symbol and setting the original superior symbol as the inferior symbol. As a result, a correct prediction becomes possible meeting the actual conditions of the input data, and high speed and efficiency of encoding become maintainable.

A further object of the invention is to provide a data encoding method of a multiple-valued information source wherein the specified number of times is set to one time. Therefore, the number of prediction bits can be reduced early, and the speed of encoding a bit series having a constant trend can be increased.

A further object of the invention is to provide a data encoding method of a multiple-valued information source wherein the prediction bit number is set to a newly-increased prediction bit number as more than the prediction bit number. Therefore, the efficiency of compression is increased and the speed of encoding is increased as more predictions are correct.

Another object of the invention is to provide a multiple-valued information source including a prediction setting process defining either "0" or "1" as a superior symbol and the other as an inferior symbol, when a multiple-valued information source that includes a plurality of bits is divided into bit planes and a binary bit string composed of "0"s and "1"s of each bit plane is input, predicting that superior symbol to continue for n units, and setting that n units as a prediction bit number; and a prediction result output process outputting either signal of "0" or "1" as a prediction correct signal, as a code word, when prediction is correct for an observed series that includes the above-mentioned prediction bit number input, and moving to the operation of encoding the next string of n bits, and outputting the other of either "0" or "1" as a prediction failed signal, as a code word, when the prediction has failed in the encoding operation; wherein a similar prediction setting process and prediction result output process are recursively iterated, setting a newly-increased prediction bit number as a prediction bit number less than n units when the prediction was correct for a specified number of times.

As a result, when the prediction is correct, n bits is represented by a single prediction correct signal. Moreover, because the encoding is performed by a bit plane, the efficiency of compression is increased, and the speed of encoding is increased. Furthermore, the efficiency of compression of the data increases even more and the speed of encoding becomes even faster as more predictions are correct.

A further object of the invention is to provide a data encoding method of a multiple-valued information source wherein the specified number of times is two; and the newly-increased prediction bit number is made to be two times the prediction bit number. Therefore, because the number of prediction bits is changed as the prediction continues to be correct, that is, from the start of a constant trend, the efficiency of compression of the data can be increased. Moreover, because the value is made to be two times the previous, it becomes identical to the number of bits of superior symbols having continued by being precisely correct, and the probability of the next prediction also being correct becomes higher. As a result, the efficiency of compression can be increased, and the speed of encoding can be made faster.

A further object of the invention is to provide a data encoding method of a multiple-valued information source wherein the n units is made to be $2^m$ (where m is an integer greater than or equal to 0). Therefore, division during failed prediction can be divided uniformly and can be divided rapidly, finally becoming a number of one bit.

Another object of the invention is to provide a data encoding method of a multiple-valued information source which further includes a former-half-correct process halving the observed series when the prediction has failed, outputting "0" as a code word when the former half of the halved observed series is all superior symbols, further halving the latter half of the observed series, and outputting a code word of "0" or "1"; and a former-half-failed process outputting "1", as a code word when there exists the inferior symbol in the above-mentioned former half of the halved observed series, further halving the above-mentioned former half of the observed series, and outputting a code word of "0" or "1"; wherein the former-half-correct process and the former-half-failed process are recursively iterated, repeating division of that observed series as long as there exists an inferior symbol in each divided observed series.

As a result, it becomes possible to achieve an efficiency of compression similar to that of a QM coder, as well as to achieve a speed of encoding several times that of a QM coder.

A further object of the invention is to provide a data encoding method of a multiple-valued information source including a latter-half-correct process halving the observed series when the prediction has failed, outputting "0" as a code word when the latter half of the halved observed series is all superior symbols, further halving the former half of the observed series, and outputting a code word of "0" or "1"; and a latter-half-failed process outputting "1" as a code word when there exists said inferior symbol in the above-mentioned latter half of the halved observed series, further halving the above-mentioned latter half of the observed series, and outputting a code word of "0" or "1"; wherein the latter-half-correct process and the latter-half-failed process are recursively iterated, repeating division of that observed series as long as there exists an inferior symbol in each divided observed series.

As a result, it becomes possible to achieve an efficiency of compression similar to that of a QM coder, as well as to achieve a speed of encoding several times that of a QM coder.

Another object of the invention is to provide a data encoding method of a multiple-valued information source that includes a plurality of bits which is divided into bit planes, the bit planes are encoded from the bit plane of the highest bit by a data encoding method and the following lower bits are output as code bits at the point when a "1" has appeared. Therefore, in the case of an input symbol having probability concentrated in the lower bits, the speed of encoding can be increased by one level, and the required memory and device housing the memory can be made smaller in scale.

Another object of the invention is to provide a data encoding device of a multiple-valued information source for dividing a multiple-valued information source that includes a plurality of bits into bit planes and compressing a binary input bit series that includes "0"s and "1"s of each bit plane, including a prediction bit length equivalent calculating and setting part for setting either of "0" or "1" as a superior symbol, setting the other of either as an inferior symbol, predicting that superior bit to continue for n units, and setting that n units as a prediction bit number; a buffer register for temporarily storing the input bit series; and a determining part for inputting each value of the above-mentioned prediction bit length equivalent calculating and setting part and the above-mentioned buffer register, outputting either signal of "0" or "1" as a prediction correct signal, as a code word, when prediction is correct for an observed series that includes the above-mentioned prediction bit number input, and outputting the other of either "0" or "1" as a prediction failed signal, as a code word, when the prediction has failed in the encoding operation; wherein a newly-decreased prediction bit number as a prediction bit number less than n units is set by the above-mentioned prediction bit length equivalent calculating and setting part when the prediction has failed a specified number of times, and a newly-increased prediction bit number as a prediction bit number more than n units is set by the above-mentioned prediction bit length equivalent calculating and setting part when the prediction was correct for a specified number of times.

As a result, if the prediction is correct, n bits is represented by a single prediction correct signal, and the like. Moreover, because the encoding is performed for each bit plane, the efficiency of compression becomes higher, and the speed of encoding becomes faster. Furthermore, the efficiency of compression of the data becomes even more increased and the speed of encoding becomes even faster as more predictions are correct.

A further object of the invention is to provide a data encoding device of a multiple-valued information source which includes a buffer register that includes a group of registers for dividing a multiple-valued information source including a plurality of bits into bit planes and temporarily storing the input bit series of each bit plane; a prediction bit length calculating part having installed inside a register for holding a variable, ofs, indicating the leading position of the observed series to encode and a register for holding a variable, width, indicating the prediction bit length; a determining part for selecting an input bit series on the above-mentioned buffer register determined by the above-mentioned width from the position of the ofs and the ofs on the above-mentioned buffer register output by this prediction bit length calculating part, outputting one superior symbol as a code bit output when that input bit series is all superior symbols, and outputting one inferior symbol when an inferior symbol is included; an input/output control signal generating part for performing an input bit request when a completion signal indicating that encoding of the input bit series inside the above-mentioned buffer register was completed was received from the above-mentioned prediction bit length calculating part; a stack memory to become a memory for holding the values of the above-mentioned width, which changes moment by moment; and a prediction bit length/superior symbol setting part for inputting the status of the past encoding by the above-mentioned prediction bit length calculating part and setting a prediction bit length and superior symbol of the input bit series newly input; wherein the above-mentioned input/output control signal generating part instructs to acquire an input bit series having a number of units indicated by the new prediction bit length newly set by the above-mentioned prediction bit length/calculation superior symbol setting part when the above-mentioned completion signal was received from the above-mentioned prediction bit length calculating part.

Thus, because the prediction bit length is changed according to a width change, if the prediction is correct, n bits are represented by a single prediction correct signal, and the like. Moreover, because the encoding is performed for each bit plane, the efficiency of compression becomes higher, and the speed of encoding becomes faster. Furthermore, the efficiency of compression of the data becomes even more increased and the speed of encoding becomes even faster as more predictions are correct. In addition, when the prediction has failed, because the next prediction is performed by reducing the number of prediction bits, the efficiency of compression and speed of encoding are not reduced very much, even when the prediction fails.

A further object of the invention is to provide a data decoding method of a multiple-valued information source for restoring a multiple-valued information source by inputting data of a multiple-valued information source that includes a plurality of bits being divided into bit planes and each bit plane being encoded, and decoding the data into a binary bit series including "0"s and "1"s, that includes an input process inputting bit-by-bit a code word, having set either of "0" or "1" of each bit plane as a superior symbol, having set the other of either as an inferior symbol, and having represented by a binary bit series that includes "0"s and "1"s the prediction result having predicted that superior symbol to continue for n units (where n is an integer greater than or equal to 1); wherein the above-mentioned superior symbols are decoded in a series of n units when the input code word was a correct prediction, and the superior symbol is newly predicted to continue for a number greater by the above-mentioned n units when correct prediction has continued for a specified number of times.

As a result, if the prediction is correct, n superior symbols can be decoded by a single code word. Moreover, because the encoding is performed for each bit plane, the efficiency of decompression becomes higher, and the speed of decoding becomes faster. Furthermore, because the number of superior symbols able to be decoded by one code word can become greater as more predictions are correct, the efficiency of decompression becomes one level higher, and the speed of decoding becomes faster.

A further object of the invention is to provide a data decoding method of a multiple-valued information source that includes an input process inputting bit-by-bit a code word whereby a multiple-valued information source composed of a plurality of bits was divided into bit planes, either of "0" or "1" of each bit plane was as a superior symbol, the other of either was set as an inferior symbol, and the prediction result having predicted that superior symbol to continue for n units (where n is an integer greater than or equal to 1) was represented by a binary bit series that includes "0"s and "1"s; and a prediction result decoding process decoding the above-mentioned superior symbol in a series of n units when the input code word is a correctly predicted value, and inputting the next code word when the input code word is a failed prediction value; wherein a process is recursively iterated whereby the above-mentioned superior symbol is decoded in a series of n-m units when the value of the above-mentioned next code word is a correctly predicted value, the next code word is input again when it is a failed prediction value, and an inferior symbol is decoded during a failed prediction when 0<n−m≦1.

Therefore, if the prediction is correct, n superior symbols can be decoded by a single code word. Moreover, because the encoding is performed for each bit plane, the efficiency of decompression becomes higher, and the speed of decoding becomes faster. Furthermore, because the number of superior symbols able to be decoded by one code word can become greater as more predictions are correct, the efficiency of decompression becomes one level higher, and the speed of decoding becomes faster. In addition, when the prediction has failed, because an operation of decreasing the prediction bit length is recursively iterated, and because the inferior symbol can be decoded in the end, the data can be decoded efficiently even when the prediction fails.

A further object of the invention is to provide a data decoding device of a multiple-valued information source for restoring a multiple-valued information source by inputting code bit being data of a multiple-valued information source that includes a plurality of bits divided into bit planes and each bit plane being encoded, and decoding the data into a binary bit series that includes "0"s and "1"s, including a prediction bit length equivalent setting and calculating part for setting the superior symbol of the above-mentioned code bit and the n units of the prediction bit length when either of "0" or "1" of each bit plane is set as a superior symbol, and the other of either is set as an inferior symbol; and a decoded bit setting part for temporarily holding a decoded bit in a specified form during input and outputting a decoded bit upon receipt of a decoded bit output permission signal from this prediction bit length equivalent setting and calculating part; wherein, when the input encoded bit is the above-mentioned superior symbol, the decoded bit output permission signal is output and the above-mentioned superior symbol is written into the above-mentioned decoded bit setting part, and when the above-mentioned superior symbol has continued for a specified number of times, the above-mentioned prediction bit length is changed to a number greater than n units.

As a result, if the prediction is correct, n superior symbols can be decoded by a single code word. Moreover, because the encoding is performed for each bit plane, the efficiency of decompression becomes higher, and the speed of decoding becomes faster. Furthermore, because the number of superior symbols able to be decoded by one code word can become greater as more predictions are correct, the efficiency of decompression becomes one level higher, and the speed of decoding becomes faster.

A further object of the invention provides a data decoding device of a multiple-valued information source for inputting bit-by-bit and decoding encoded bits of a multiple-valued information source that includes a plurality of bits divided into bit planes, either of "0" or "1" of each bit plane is set as a superior symbol, the other of either being set as an inferior symbol, and the prediction result having predicted that superior symbol to continue for n units (where n is an integer greater than or equal to 1) as represented by a binary bit series composed of "0"s and "1"s, including a prediction bit length/superior symbol setting part for setting a prediction bit length of the above-mentioned encoded bit and the above-mentioned superior symbol; a prediction bit length calculating part for inputting the prediction bit length and superior symbol from this prediction bit length/superior symbol setting part and outputting a decoded bit output permission signal according to the value of this encoded bit; and a decoded bit setting part for inputting the above-mentioned decoded bit output permission signal, temporarily holding the encoded bit in a specified form during input, and outputting a decoded bit; wherein the above-mentioned superior symbol is written into the above-mentioned decoded bit setting part in a series of n units when the code word input into the above-mentioned prediction bit length calculating part is a correctly predicted value, and the next encoded bit is input when the above-mentioned input code word is a failed prediction, furthermore the above-mentioned superior symbol is written into the above-mentioned decoded bit setting part in a series of n-m units (where m is an integer greater than or equal to 1 and less than n) when that value is a correctly predicted value, and the next code is again input into the prediction bit length calculating part when it is a failed prediction value.

Therefore, if the prediction is correct, n superior symbols can be decoded by a single code word. Moreover, because the encoding is performed for each bit plane, the efficiency of decompression becomes higher, and the speed of decoding becomes faster. Furthermore, because the number of superior symbols able to be decoded by one code word can become greater as more predictions are correct, the efficiency of decompression becomes one level higher, and the speed of decoding becomes faster. In addition, when the prediction has failed, because an operation of decreasing the prediction bit length is recursively iterated, and because the inferior symbol can be decoded in the end, the data can be decoded efficiently even when the prediction fails.

A further object of the invention is to provide a data encoding method of a multiple-valued information source including a prediction setting process defining either "0" or "1" as a superior symbol and the other as an inferior symbol, when a multiple-valued information source composed of a plurality of bits is divided into level planes and a binary bit string that includes "0"s and "1"s of each level plane is input, predicting that superior symbol to continue for n units, and setting that n units as a prediction bit number; and a prediction result output process outputting either signal of "0" or "1" as a prediction correct signal, as a code word, when prediction is correct for an observed series that includes the above-mentioned prediction bit number input, and moving to the operation of encoding the next string of n bits, and outputting either "0" or "1" as a prediction failed signal, as a code word, when the prediction has failed in the encoding operation; wherein a similar prediction setting process and prediction result output process are recursively iterated, setting a newly-decreased prediction bit number as a prediction bit number less than n units when the prediction has failed a specified number of times.

Thus, if the prediction is correct, predicting that the superior symbol will continue for n units, the n bits become represented by a single prediction correct symbol. Moreover, because the encoding is performed for each level plane, the efficiency of compression becomes higher, and the speed of encoding becomes faster. Furthermore, when the prediction has failed, because the next prediction is performed by decreasing the number of prediction bits, the efficiency of compression and speed of encoding do not decrease very much even when the prediction fails.

A further object of this invention provides a data encoding method of a multiple-valued information source including a prediction setting process defining either "0" or "1" as a superior symbol and the other as an inferior symbol, when a multiple-valued information source that includes a plurality of bits is divided into level planes and a binary bit string that includes "0"s and "1"s of each level plane is input, predicting that superior symbol to continue for n units, and setting that n units as a prediction bit number; and a prediction result output process outputting either signal of "0" or "1" as a prediction correct signal, as a code word, when prediction is correct for an observed series including the above-mentioned prediction bit number input, and moving to the operation of encoding the next string of n bits, and outputting the other of either "0" or "1" as a prediction failed signal, as a code word, when the prediction has failed in the encoding operation; wherein a similar prediction setting process and prediction result output process are recursively iterated, setting a newly-increased prediction bit number as a prediction bit number more than n units when the prediction was correct for a specified number of times.

As a result, if the prediction is correct, the n bits become represented by a single prediction correct symbol, and the like. Moreover, because the encoding is performed for each level plane, the efficiency of compression becomes higher, and the speed of encoding becomes faster. Furthermore, as more predictions are correct, the efficiency of compression of the data increases one level more and the speed of encoding becomes one level faster.

An additional object of the invention is to provide a data encoding method of a multiple-valued information source including an input process dividing a multiple-valued information source includes a plurality of bits into level planes, further dividing these level planes into groups such that level planes having concentrated probability are handled independently and those having low probability are compiled as a plurality of level planes, and inputting from the side of the group numbers having concentrated probability when inputting a determining bit string, which includes bits that include "0"s and "1"s and determining whether the multiple-valued information source input pertains to each group number; a prediction setting process defining either "0" or "1" of the determining bit string of each group as a superior symbol and the other as an inferior symbol, predicting that superior symbol to continue for n units, and setting that n units as a prediction bit number; a prediction result output process outputting either signal of "0" or "1" as a prediction correct signal, as a code word, when prediction is correct for an observed series that includes the above-mentioned prediction bit number input, and moving to the operation of encoding the next string of n bits, and outputting the other of either "0" or "1" as a prediction failed signal, as a code word, when the prediction has failed in the encoding operation; and a recursive process recursively iterating similar prediction setting process and prediction output process setting a newly-decreased prediction bit number as a prediction bit number less than n units when the prediction has failed a specified number of times; wherein coding of a given input symbol is completed when there is a signal indicating that the above-mentioned determining bit string pertains to a given group, otherwise the above-mentioned prediction setting process, the above-mentioned prediction result output process, and the above-mentioned recursive process are executed for the determining bit string of a group having less concentrated probability than the given group.

Thus, because the data is divided into level planes, moreover, because the level planes having concentrated probability are handled independently and those having low concentration of probability are handled in compilation, the number of level planes to be encoded can be decreased, and the memory for management of runs of the number of prediction bits can be decreased. Moreover, the efficiency of encoding does not drop that much. Also, if the prediction is correct, predicting that the superior symbol will continue for n units, the n bits become represented by a single prediction correct symbol, and the like, the efficiency of compression becomes higher, and the speed of encoding becomes faster. Furthermore, when the prediction has failed, because the next prediction is performed by decreasing the number of prediction bits, the efficiency of compression and speed of encoding do not decrease so much even when the prediction fails.

A further object of the invention provides a data encoding method of a multiple-valued information source wherein the n units is made $2^m$ (where m is an integer greater than or equal to 0). Therefore, division during failed prediction can be divided uniformly and can be divided rapidly, finally becoming a number of one bit.

A further object of the invention provides a data encoding method of a multiple-valued information source including a former-half-correct process halving the observed series when the prediction has failed, outputting "0" as a code word when the former half of the halved observed series is all superior symbols, further halving the latter half of the observed series, and outputting a code word of "0" or "1"; and a former-half-failed process outputting "1" as a code word when there exists said inferior symbol in the above-mentioned former half of the halved observed series, further halving the above-mentioned former half of the observed series, and outputting a code word of "0" or "1"; wherein the former-half-correct process and the former-half-failed process are recursively iterated, repeating division of that observed series as long as there exists an inferior symbol in each divided observed series.

As a result, it becomes possible to achieve an efficiency of compression similar to that of a QM coder, as well as to achieve a speed of encoding several times that of a QM coder.

A further object of the invention provides a data encoding device of a multiple-valued information source including a prediction bit length equivalent calculating and setting part for dividing a multiple-valued information source that includes a plurality of bits into level planes, further dividing within these level planes into groups such that level planes having concentrated probability are handled independently and those having low probability are compiled as a plurality of level planes, setting either of "0" or "1" of a determining bit string, which includes bits that include "0"s and "1"s and determining whether the multiple-valued information source input pertains to each group number, as a superior symbol, setting the other of either as an inferior symbol, predicting that superior bit to continue for n units, and setting that n units as a prediction bit number; a buffer register for temporarily storing the input bit series; and a determining part for inputting each value of the above-mentioned prediction bit length equivalent calculating and setting part and the above-mentioned buffer register, outputting either signal of "0" or "1" as a prediction correct signal, as a code word, when prediction is correct for an observed series that includes the above-mentioned prediction bit number input, and outputting the other of either "0" or "1" as a prediction failed signal, as a code word, when the prediction has failed in the encoding operation; wherein a newly-decreased prediction bit number which is a prediction bit number less than n units is set by the above-mentioned prediction bit length equivalent calculating and setting part when the prediction has failed a specified number of times, and a newly-increased prediction bit number which is a prediction bit number more than n units is set by the above-mentioned prediction bit length equivalent calculating and setting part when the prediction was correct for a specified number of times.

As a result, if the prediction is correct, the n bits become represented by a single prediction correct symbol. Moreover, because the data is encoded for each level plane, the efficiency of compression becomes higher, and the speed of encoding becomes faster. Moreover, because the number of prediction bits becomes more as more predictions are correct, the efficiency of compression of the data increases one level more and the speed of encoding becomes one level faster. In addition, when the prediction has failed, because the next prediction is performed by decreasing the number of prediction bits, the efficiency of compression and speed of encoding do not decrease so much even when the prediction fails. Also, because the level planes having low concentration of probability are handled in compilation, the number of level planes to be encoded can be decreased while suppressing the decrease of efficiency.

A further object of the invention provides a multiple-valued information source including a buffer register that includes a group of registers for dividing a multiple-valued information source composed of a plurality of bits into level planes, further dividing these level planes into groups such that level planes having concentrated probability are handled independently and those having low probability are compiled as a plurality of level planes, and temporarily storing an input bit series that includes a determining bit string, which includes by bits that include "0" and "1"s and determining whether the multiple-valued information source input pertains to each group number; a prediction bit length calculating part having installed inside a register for holding a variable, ofs, indicating the leading position of the observed series to encode and a register for holding a variable, width, indicating the prediction bit length; a determining part for selecting an input bit series on the above-mentioned buffer register determined by the above-mentioned width from the position of the ofs and the ofs on the above-mentioned buffer register output by this prediction bit length calculating part, outputting one superior symbol as a code bit output when that input bit series is all superior symbols, and outputting one inferior symbol when an inferior symbol is included; an input/output control signal generating part for performing an input bit request when a completion signal indicating that encoding of the input bit series inside the above-mentioned buffer register was completed was received from the above-mentioned prediction bit length calculating part; a stack memory to become a memory for holding the values of the above-mentioned width, which changes moment by moment; and a prediction bit length/superior symbol setting part for inputting the status of the past encoding by the above-mentioned prediction bit length calculating part and setting a prediction bit length and superior symbol of the input bit series newly input; wherein the above-mentioned input/output control signal generating part instructs to acquire an input bit series having a number of units indicated by the new prediction bit length newly set by the above-mentioned prediction bit length/calculation superior symbol setting part when the above-mentioned completion signal was received from the above-mentioned prediction bit length calculating part.

Thus, because the prediction bit length is changed according to a width changing by the moment, if the prediction is correct, n bits are represented by a single prediction correct signal, and the like. Moreover, because the encoding is performed for each level plane, the efficiency of compression becomes higher, and the speed of encoding becomes faster. Furthermore, because the number of prediction bits increases as more predictions are correct, the efficiency of compression becomes increased one level more. In addition, when the prediction has failed, because the number of prediction bits is reduced, the efficiency of compression and speed of encoding are not reduced that much, even when the prediction fails. Also, because the level planes having low concentration of probability are handled in compilation, the number of level planes to be encoded can be decreased while suppressing the decrease of efficiency.

In the data encoding method and data decoding method of a multiple-valued information source of the invention, binary bit strings are formed by dividing the multiple-valued information source into bit planes and by representing level planes divided into groups. Also, when inputting those binary bit strings, "0" or "1" is defined as a superior symbol, and it is predicted that the superior symbol will continue for n units. When this prediction is correct, either "0" or "1" is output as a code word, and encoding is completed. When it has failed, the other of "0" or "1" is output, the observed series is divided, and the signal statuses of the respective divided series are confirmed in the same manner as described above, and encoding is continued. Also, encoding is performed by iterating a similar division and prediction until the prediction is correct or until division becomes impossible. Also, the initial prediction bit number n is changed according to the success and failure of prediction, and it follows the probability variation of the observed series.

Also, in the data encoding method and data decoding method of a multiple-valued information source of the invention, decoding is performed by using the reverse algorithm of the data encoding method and data decoding method of a multiple-valued information source shown first.

As explained above, with the data encoding method and data encoding device of a multiple-valued information source of the invention, an efficiency of encoding parallel to a QM coder can be obtained, and on the other hand, the speed of encoding becomes extremely fast compared to a QM coder. Therefore, it possesses superior utility compared with the various methods of compression of a multiple-valued information sources presently being used.

Also, with the data decoding method and data decoding device of a multiple-valued information source in accordance with the invention, an efficiency of decompression parallel to a QM coder can be obtained, and on the other hand, the speed of decoding becomes extremely fast compared to a QM coder. Therefore, it possesses superior utility compared with most methods of decoding a multiple-valued information source presently being used.

BRIEF DESCRIPTION OF THE DRAWINGS

FIG. 7 shows the compression rate and encoding time using the data encoding method and data encoding device for predictive run-length encoding used in the invention.

FIG. 12 is a drawing for explaining the specific operation of the second method shown in FIG. 11.

FIG. 13 is a drawing explaining grouping in the fourth method of data encoding of multiple-valued information source of the invention.

DETAILED DESCRIPTION OF PREFERRED EMBODIMENTS

Examples of the embodiments of the invention are explained below, based on FIGS. 1–17. First, the compression and decompression of binary bit strings after a multiple-valued information source has been converted to binary is explained. Then, the methods of converting a multiple-valued information source into binary bit strings suitable for operations such as the compression and decompression methods are explained.

First, an outline of a basic algorithm used in the invention and its operation are shown in FIGS. 1–10. The object of the algorithm of this invention is, similarly to that of a QM coder, compression of a binary bit string. First, as an initial value, either "0" or "1" is defined as a superior symbol, and run, being the number of units that symbol is predicted to continue, is set. When the occurrence probability of the input series is unclear, run may be set to 1. Encoding proceeds following rules described below. The number of run corresponds to the number of prediction bits.

Figure 1:
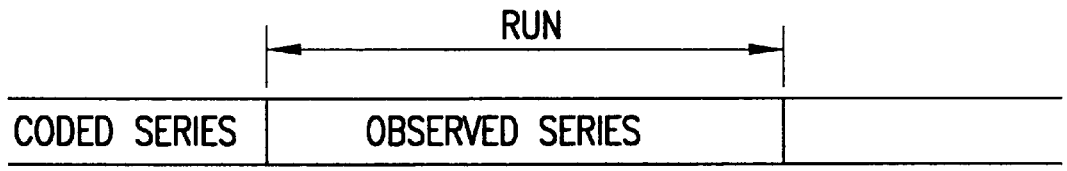
FIG. 1 shows the predictive run-length encoding algorithm used in the invention, and illustrates the relationship between an observed series and the prediction bit number run.

As shown in FIG. 1, when it is predicted that the observed series indicated as a run is entirely of superior symbols, and when the prediction is correct, "0" is output as a code word, and the encoding of this series is completed. When the prediction has failed, "1" is output, and the following division and encoding process is executed.

Figure 2:
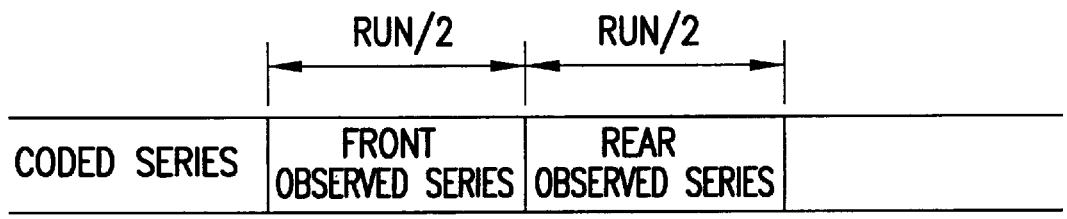
FIG. 2 shows an overview of the predictive run-length encoding algorithm used in the invention, and illustrates the status of having divided the observed series of FIG. 1.
Figure 3:
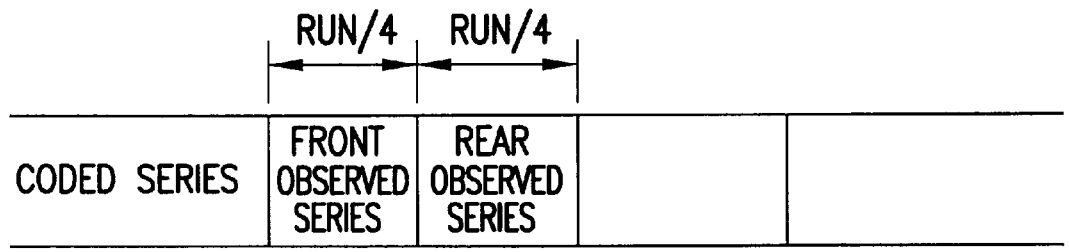
FIG. 3 shows the predictive run-length encoding algorithm used in the invention, and illustrates the status of having further divided the observed series of FIG. 2.

When the prediction has failed, the observed series is divided into two parts, a former half and a latter half, as shown in FIG. 2. When the former half is entirely of superior symbols, "0" is output as a code word, and encoding of the former half of the series is completed. When there exists an inferior symbol in the former half of the series, "1" is output as a code word, and the following re-division process is executed. If the encoding of the former half is completed, the observed series is moved to the latter half, and encoding is performed in the same manner as that of the former half of the series. For a series in which there exists an inferior symbol, the division and encoding process described above is iterated, dividing the series to the extent possible.

The division does not necessarily have to be into two equal parts, and unequal divisions and division into three or more parts is also acceptable. Also, the superior symbol may be output rather than a "0" when prediction is correct, and the inferior symbol may be output rather then a "1" when failed. A "1" also may be output when the prediction is correct and a "0" may also be output when the prediction has failed.

The basic algorithm for data encoding of a bit string converted to binary is the foundation of the invention. However, the following processing may be added further in order to increase the efficiency of encoding pursuant to variation of the occurrence probability of the input series. That is, run is increased two-fold, three-fold, four-fold, etc., when the series predicted by run continues for a specified number of times, for example, when correct two times. Moreover, when the prediction continues to be on the mark, the scope of prediction may be further expanded. Also, when an inferior symbol exists in the latter half of the series predicted by run, run may be decreased to ¼, ⅓, ⅕, ⅙, etc. This is because, when there exists an inferior symbol in the latter half, it is determined that more inferior symbols are contained in the subsequent series. Therefore, when an inferior symbol exists only in the former half of the series predicted by run, run may be set to a value, for example ½, being greater than when there exists an inferior symbol in the latter half. Also, when run is 1 and when that is an inferior symbol, the subsequent input series are reversed. That is, the superior symbol is changed.

Figure 4:
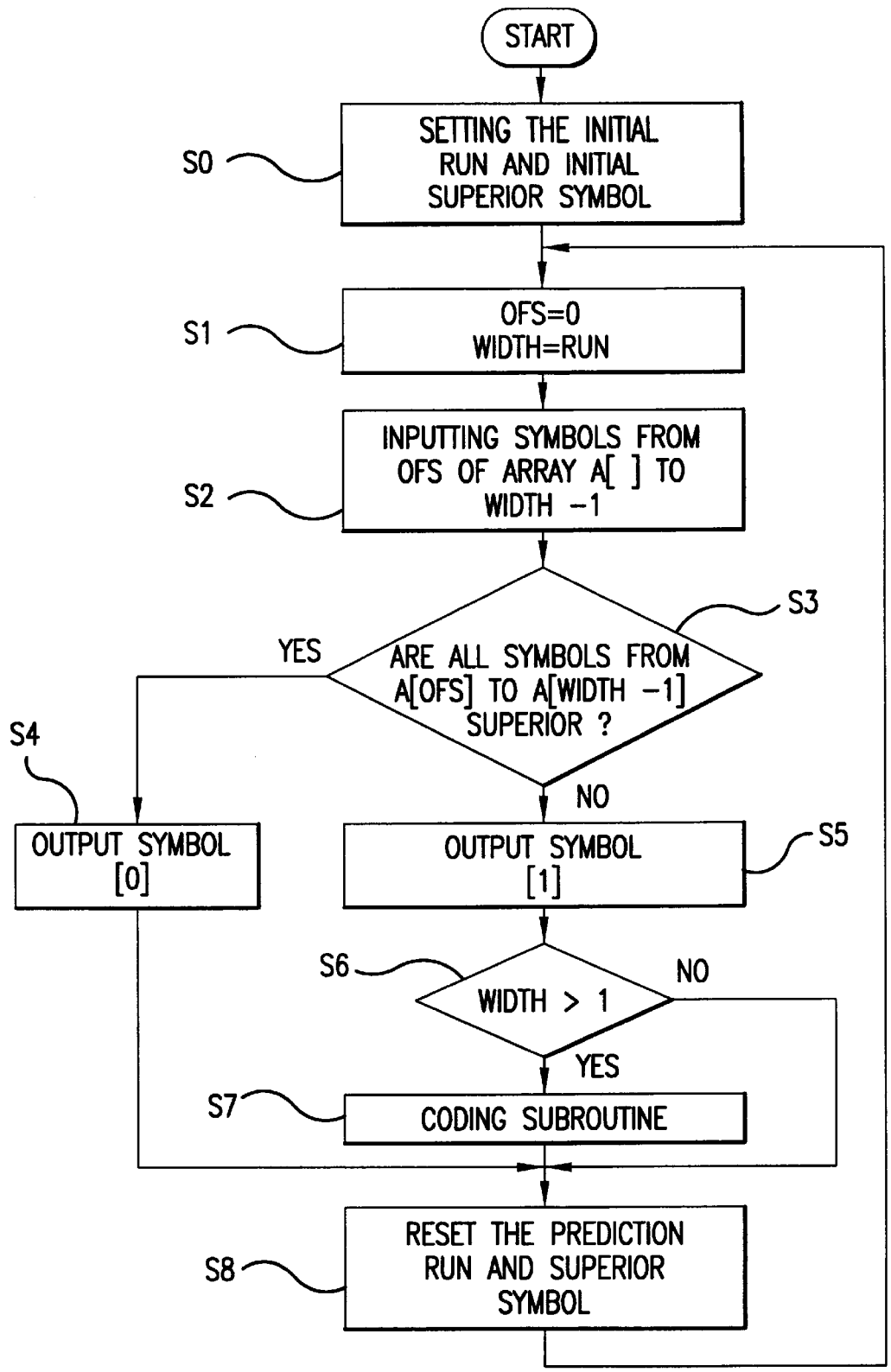
FIG. 4 is a flow chart illustrating the encoding process of the predictive run-length encoding used in the invention and shows the main encoding routine.
Figure 5:
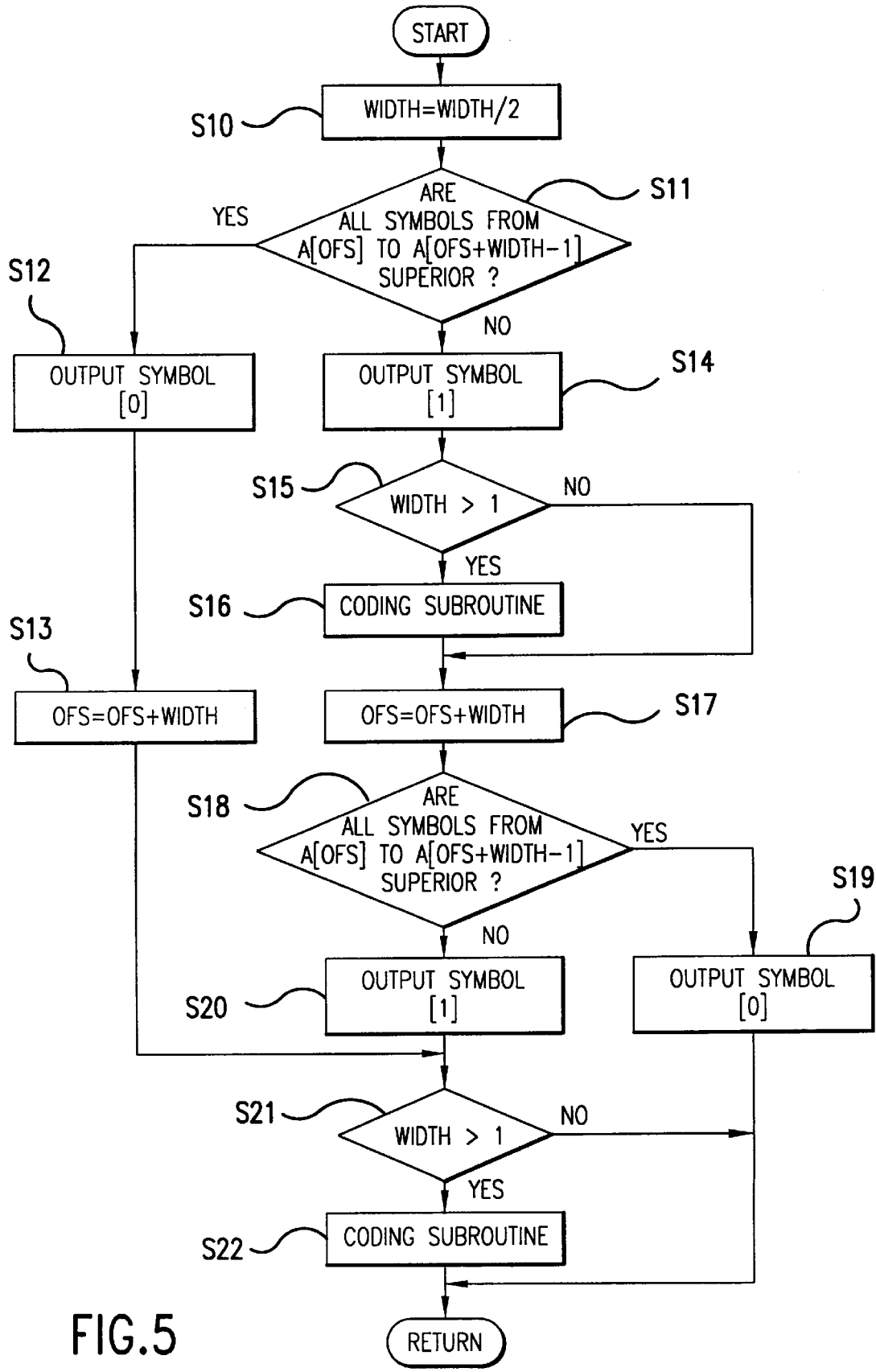
FIG. 5 is a flow chart illustrating the encoding process of the predictive run-length encoding used in the invention and shows the encoding subroutine.

The process of encoding bit strings converted to binary disclosed in this invention is constituted by the main encoding routine shown in FIG. 4 and the encoding subroutine shown in FIG. 5. The encoding subroutine shown in FIG. 5 performs a so-called recursive functional readout, calling the same subroutine from the subroutine.

First, each step in the main encoding routine shown in FIG. 4 is explained. The object of the encoding is an input series consisting of binary bit strings. At the beginning, setting of run, being the initial value of prediction, and selection of the superior symbol ("0" or "1") are performed (step S0). Next, "0" is assigned to the local variable ofs, and run is assigned to the width (step S1). Here, ofs is a pointer of a predefined array A for encoding, and it indicates the position of the initial prediction bit. Accordingly, the initial value becomes 0. The width is a value indicating how many of the bits from the initial prediction bit indicated by ofs to make the object of prediction, and the initial value of prediction, run, is assigned. Then, the input bits are written from A[ofs] of the predefined array A to A[width−1] (step S2). Also, when the entirety of A[ofs] to A[width−1] is of superior symbols, the process advances to step S4. When there is included even one inferior symbol, the process advances to step S5.

When the prediction is on the mark, the prediction correct signal "0" is output as a code word, and encoding of the series taken into the array A is completed (step S4). However, when the prediction has failed, the prediction failure signal "1" is output as a code word (step S5). Also, it is detected as to whether or not the width is greater than or equal to 1 (step S6). If the width is less than or equal to 1, further division is impossible and the process advances to step S8 without moving to the encoding subroutine of step S7. However, if the width exceeds 1, the encoding subroutine of FIG. 5 is called (step S7).

In step S8, resetting of the predicted run and changing of the superior symbol are performed. Specifically, in step S8, run is increased if the prediction is on the mark, and it is decreased if failed. Also, various methods may be employed in regard to how to evaluate when the prediction is on the mark and when it has failed. For example, a method can be employed such as immediately reducing run when the prediction has failed, or first reducing run when the prediction has failed continuously for two or more times. Furthermore, a method can also be employed in which the degree of contraction of the run is made different when only the former half of the series or the latter half of the series has failed, and when both have failed. Also, a method can also be employed such as setting the next predicted run by drawing a table of specified probabilities using the bit series already encoded.

When the first prediction has failed in the main encoding routine, the encoding subroutine shown in FIG. 5 is called in step S7. The variables passed to the encoding subroutine are ofs and width. Each step of the encoding subroutine is explained below.

In the encoding subroutine, the scope of prediction is halved by performing division of the prediction into a former half of the series and latter half of the series (step S10). Specifically, the width received as a variable from the parent routine is halved. Also, in the next step S11, it is checked as to whether or not the former half of the series (A[ofs] to A[osf+width−1] of the array) is entirely superior symbols. If it is entirely superior symbols, the process advances to step S12. If there exists even one inferior symbol, the process advances immediately to step S14.

If the former half of the series consists entirely of superior symbols, "0" is output as a code word (step S12). Also, the width is added to the pointer ofs indicating the starting position of the former half of the series so as to indicate the starting position of the latter half of the series. Also, when the former half of the series is entirely of superior symbols, because there must exist an inferior symbol in the latter half, it is not necessary to output "1" as a code word indicating that the prediction of the latter half of the series has failed. Accordingly, step S20 described later is skipped, and the process advances to step S21.

On the other hand, when there exists an inferior symbol in the former half of the series, "1" is output as a code word (step S14). Next, it is checked to determine whether the width exceeds 1 (step S15). If it is less than or equal to 1, because further division is impossible, calling of the child encoding subroutine (step S16) is skipped, and the process moves to step S17. If the width is greater than or equal to 2, the series is further divided into two, and they must be encoded respectively. The child encoding subroutine for that is called (step S16). The child encoding subroutine is completely identical to the encoding subroutine shown in FIG. 5. In short, the identical routine (function) is called recursively.

When encoding of the former half of the series by recursive calling of the encoding subroutine is completed, the width established in step S10 is added to the pointer ofs indicating the starting position of the former half of the series, changing it so as to indicate the starting position of the latter half of the series (step S17). Then, it is checked as to whether or not the latter half of the series (A[ofs] to A[ofs+width−1] of array A) is entirely of superior symbols (step S18). If it is entirely of superior symbols, the process advances to step S19. If there exists even one inferior symbol, the process advances immediately to step S20. Also, if the latter half of the series is entirely of superior symbols, "0" is output as a code word (step S19).

However, if an inferior symbol exists in the later half of the series, "1" is output as a code word (step S20). Also, it is then checked to determine whether or not the width exceeds 1 (step S21). If it is less than or equal to 1, because further division is impossible, step S22 executing the child encoding subroutine is skipped, and the process advances to the process of encoding the next observed series. Moreover, if the width of the latter half of the series is also greater than or equal to 2, the series is further divided into two, and they are encoded respectively. Therefore, the identical encoding subroutine as the encoding subroutine shown in FIG. 5 is called (step S22). Encoding of the latter half of the series is executed by recursive calling of this encoding subroutine.

A specific example of the process of encoding a binary bit string is explained. Namely, as a specific example of encoding, a case is explained when encoding input bits represented as "00001001", having a run, being the initial value of prediction, of 8 and a superior symbol of "0".

First, in step S2 of the main encoding routine of FIG. 4, the above input string is input from A[0] to A[7]. In step S3, it is determined as to whether from A[0] to A[7] is entirely of "0"s. In the above example, because "1" is included in the bit string, the process moves to step S5, and "1" is first output as a code word. Next, in step S6, the size of the width is checked, but since the width is 8 at this time, the process advances to the encoding subroutine (step S7).

In the encoding subroutine, first, in step S10, the width is set to 4, being one half. Also, in step S11, it is checked to determine whether or not the former half of the input bits, namely A[0] to A[3], are entirely of "0"s. In this case, it is entirely of "0"s so the process advances to step S12, and "0" is output as a code word. The encoding of the former half of the series is completed above. Next, step S13 is executed, and the process moves to encoding the latter half of the series. If the former half of the series is entirely of "0"s, it is clear that there is included a "1" in the latter half of the series. Accordingly, in step S21, the latter half of the series must be further divided as long as the width is not less than or equal to 1. Then, the encoding subroutine is called again in step S13 as a child process. Moreover, as preprocessing for that, in step S13 as described above, the width is added to ofs, setting ofs to the starting position of the latter half of the series.

In step S22, the child encoding subroutine is called with ofs and width as variables. In step S22, executing the child encoding subroutine, first, the width is further halved and changed to 2 in step S10 of the encoding subroutine shown in FIG. 5. Next, in step S11, it is determined whether or not the former half of the series, namely A[4] and A[5], is entirely of "0"s. In this case, because A[4] is "1", the process moves to the next step S14, and "1" is output as a code word. Also, in step S15, it is determined whether the width exceeds 1, and a grandchild process is called in step S16. In the grandchild encoding subroutine, the width first becomes 1 in step S15. Because A[4] is "1", processing moves from step S11 to step S14, and the code word "1" is output. In step S15, because the width is less than or equal to 1, step S16 is skipped, and ofs is changed to 5 in step S17. Because A[5] is "0", processing moves from step S18 to step S19, and the code word "0" is output.

Next, the process leaves the grandchild encoding subroutine, and it returns to the child encoding subroutine. Since ofs of the child encoding subroutine is 4 and the width is 2, ofs is changed to 6 in step S17. Accordingly, in step S18, A[6] and A[7] are checked. In this case, because A[7] is "1", the process moves to step S20, and the code word "1" is output. Also, a grandchild encoding subroutine is again called in step S22. In the grandchild encoding subroutine, because A[6] is "0", the code word "0" is output in step S12. Also, because the width is 1, the process returns to the child encoding subroutine, skipping step S22.

The process, having returned to the child encoding subroutine, continues to the encoding subroutine, and resetting of the predicted run and superior symbol is performed. In the case of this example, the first prediction has failed, but because the former half was on the mark in the second prediction, processing was applied with run changed from 8 to 4 and the superior symbol continuing to be "0". For setting of the predicted run, it may be set to be changed when prediction has failed two times consecutively.

By the process of encoding a binary bit string such as the above, the input bits "00001001" became an encoded series "1011010". Accordingly, in this case, an 8-bit input series was compressed into 7 bits.

Figure 6:
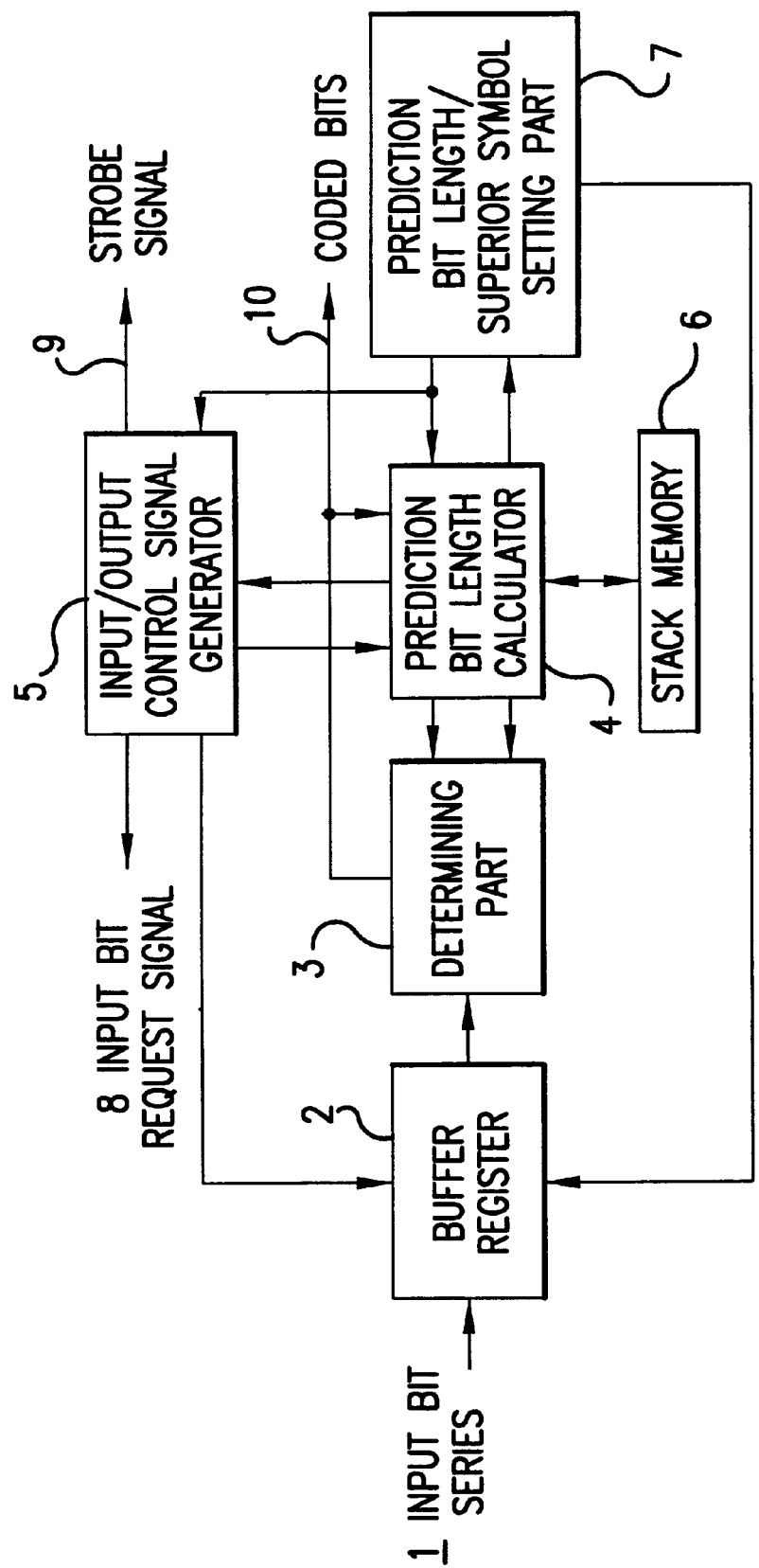
FIG. 6 is a block drawing showing the structure of an embodiment of a data encoding device for predictive run-length encoding used in the invention.

Next, a data encoding device having a process of encoding binary bit strings performed as above is shown in FIG. 6.

The data encoding device for binary bit strings includes a buffer register 2 which is a group of registers for temporarily storing input bit series 1 corresponding to the input bits shown in FIGS. 4 and 5 according to instruction from an input/output control signal generator 5 to be described; a determining part 3 for inputting and comparing the data from this buffer register 2 and data from a prediction bit length calculator 4 to be described; a prediction bit length calculator 4 having a register A and register B internally installed for holding the two variables, ofs and width, shown in FIGS. 4 and 5; an input/output control signal generator 5 for controlling input and output; a stack memory 6 being a memory for holding the value of the width changing moment by moment; and a prediction bit length/superior symbol setting part 7 for setting run, which is the prediction bit length, and the superior symbol.

Buffer register 2 has the capacity at least for storing an input bit series 1 having a number of bits corresponding to the largest run, which is the prediction bit length, set by prediction bit length/superior symbol setting part 7. Furthermore, it also operates to input a reversed input bit series 1 under instruction of prediction bit length/superior symbol setting part 7.

Determining part 3 selects the input bit series 1 on buffer register 2 defined by the ofs on buffer register 2 and the width indicated by the number of bits from that ofs to become the object of prediction output by prediction bit length calculator 4. When those are entirely of "0"s, a "0" is output as a coding bit 10, that is, as a code word for a prediction correct signal. When a "1" is included, a "1" is output as a prediction failed signal.

Prediction bit length calculator 4 has a register A and register B internally installed for holding the two variables, ofs and width, as described above. Among these variables, width is set to the bit length, run, for the first prediction output by prediction bit length/superior symbol setting part 7, having received an encoding start signal input from input/output control signal generator 5. Meanwhile, ofs is initialized to 0.

After this initialization, from the next cycle, prediction bit length calculator 4 causes determining part 3 to investigate the logic of the input bit series 1 on buffer register 2 defined by the ofs and the width, and acquires the result of that determination. When the result of determination is "1", that is, when the prediction has failed, the width in register B is halved, and at the same time, that value is written to stack memory 6. However, this limitation does not exist when the width is already 1. Here, width in register B is added to ofs in register A, and furthermore, the value of the width that was just previously written by stack memory 6 is read out and stored in register B.

When the result of determination is "0", that is, when the prediction was on the mark, the width in register B is added to ofs in register A, and furthermore, the value of the width that was just before written by stack memory 6 is read out and stored in register B. The processing described above is pursued for each cycle while determining the input bit series 1. Also, as encoding processing as described above is pursued, the ofs in register A gradually becomes larger, but when this ofs has become equal to the temporarily predicted run, encoding of the input bit series 1 acquired into buffer register 2 is completed. Accordingly, at this time, a signal notifying the completion of encoding is sent to input/output control signal generator 5, and having received this, input/output control signal generator 5 activates an input bit request signal 8, and at the same time instructs buffer register 2 to acquire a new input bit series 1.

When input/output control signal generator 5 is in the initial state or when a signal to the effect that encoding of the input bit series 1 in buffer register 2 is completed was received from prediction bit length calculator 4, input/output control signal generator 5 activates an input bit request signal 8, and in addition instructs buffer register 2 for the acquisition of an input bit series 1 having a number of units indicated by the predicted run input by prediction bit length/superior symbol setting part 7. Also, when the number of bits indicated by the predicted run is input into buffer register 2, an encoding start signal is output to prediction bit length calculator 4. Also, a strobe signal 9 as synchronizing signal is activated until encoding is completed one cycle later than that output.

Stack memory 6 is a memory for maintaining the value of the width changing moment by moment as described above, and it is a so-called first-in-last-out memory. Specifically, it is a memory that outputs last a value written in first. Stated conversely, it is a memory that outputs first a value written in last. Into this stack memory 6, the value of the width changing moment by moment is written.

Prediction bit length/superior symbol setting part 7 inputs the status of past coding (to what degree the prediction was correct, or to what degree it has failed, for example) from prediction bit length calculator 4, and sets run, which is the prediction bit length, of the newly input bit series 1 and the superior symbol. The prediction 5 bit length, run, is input into prediction bit length calculator 4 and a superior symbol setting signal is input into buffer register 2.

The process of encoding binary bit strings shown before is executed by a data encoding device for binary bit strings configured as above. Also, the compression rate and encoding time of this encoding process are shown in FIG. 7. FIG. 7 shows the compression rates and encoding times for four types of files when using the process of encoding binary bit strings using the present invention, as well as the compression rates and encoding times of a conventional QM coder as reference. As shown in FIG. 7, the method of encoding binary bit strings used in the invention is at the same level as a QM coder for compression rate, and the encoding time is greatly shortened.

Next, the process of decoding binary bit strings of the invention is explained. The process of decoding binary bit strings includes a main decoding routine of FIG. 8 and a decoding subroutine of FIG. 9. Moreover, the decoding subroutine of FIG. 9 is performed by recursive calls within the same subroutine in the same manner as the encoding subroutine of FIG. 5.

First, each step of the main decoding routine is explained. At the beginning, setting of the initial value of prediction, run, and selection of the superior symbol are performed (step S30). These values are naturally set to the same values as those on the encoding side. Next, "0" is assigned to the local variable ofs, and is assigned to the width (step S31). Also, one bit of the code word to become the encoded bit output 10 is input (step S32). Next, in step S33, the logic of the code word is checked. If it is "0", the process moves to step S34, and if it is "1", the process advances to step S35. Here, code word "0" becomes the prediction correct signal indicating that the prediction was on the mark.

When the code word is "0", the superior symbols are written from A[ofs] to A[width−1]. However, when the code word is "1", it indicates that the prediction has failed. The size of the width is then checked. If it exceeds 1, it is divided and the process advances to step S37 because further prediction is possible, and the decoding subroutine is called. If it is less than or equal to 1, the process advances to step S36, and the inferior symbol is written into A[ofs].

In step S38, resetting the predicted run is performed, and if necessary, changing the superior symbol is performed. This resetting and changing naturally are performed according to the same rule as that of the encoding side. In step S39 following step S38, the decoded data from A[ofs] to A[width−1] is output.

Figure 8:
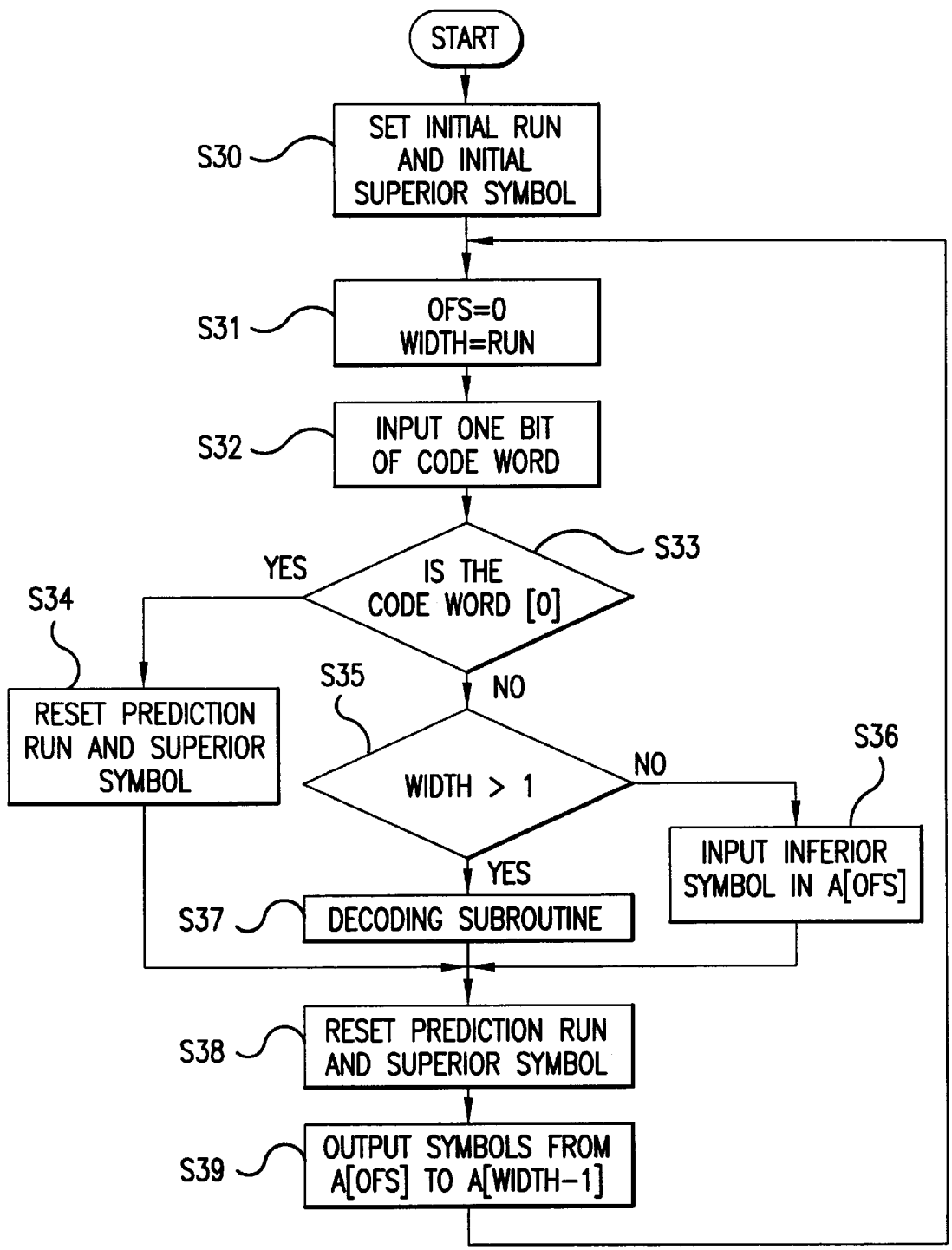
FIG. 8 is a flow chart for illustrating the decoding process of the predictive run-length encoding used in the invention and shows the main decoding routine.
Figure 9:
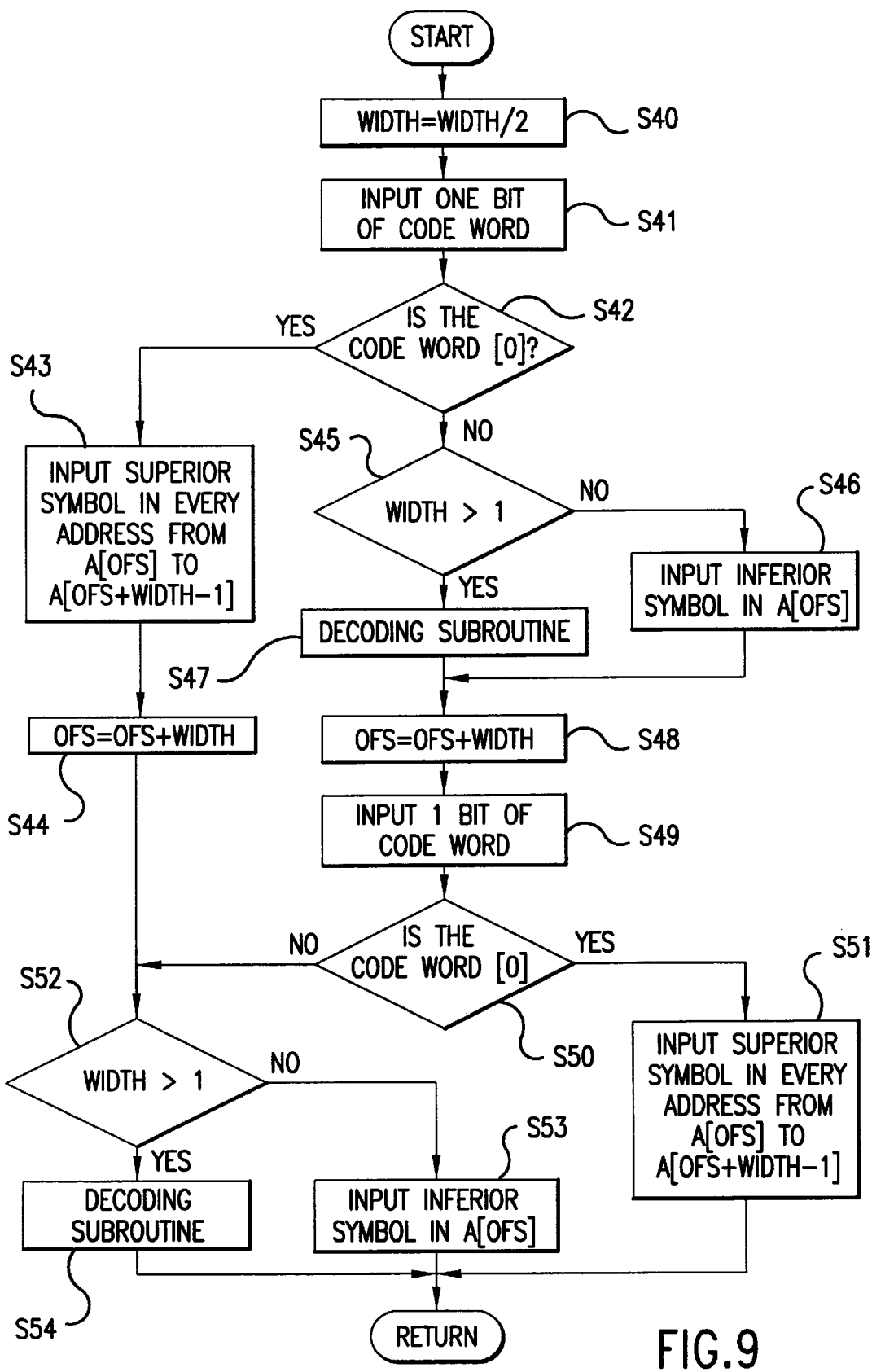
FIG. 9 is a flow chart illustrating the decoding process of the predictive run-length encoding used in the invention and showing the decoding subroutine.

When the prediction has failed in determination of the first prediction of step S33 in the main decoding routine shown in FIG. 8, the decoding subroutine of FIG. 9 is called in step S37. The variables passed to this decoding subroutine are the ofs and the width. Below, each step of the decoding subroutine is explained.

First, the width is halved and the scope of prediction is divided into two (step S40). Next, one bit of the code word is input (step S41). This bit is the result of prediction of the former half of the series. Next, in step S42, the logic of the input code word is checked. When it is "0", the process advances to step S43, and when it is "1", the process moves to step S45. Here, the code word "0" indicates that prediction was on the mark. Accordingly, superior symbols are written into the former half of the series, that is, from A[ofs] to A[of s+width−1] (step S43). Next, in step S44, the width is added to the pointer ofs indicating the starting position of the former half of the series, changing it so as to indicate the starting point of the latter half of the series. Also, when the prediction of the former half of the series was on the mark, an inferior symbol necessarily exists in the latter half of the series. Accordingly, the process advances to step S52, skipping step S49 performing determination of prediction of the latter half of the series and step S50.

On the other hand, when the code word is "1", the process moves from step S42 to step S45, and the size of the width is checked. When it is less than or equal to 1, there is no need to divide and predict beyond this, that is, the process advances to step S46 because the decoded bits have been confirmed. When it is greater than or equal to 2, because it is necessary to divide and predict further, the decoding subroutine is called in step S47. In step S46, the inferior symbol is written into A[ofs]. Also, in step S47, the decoding subroutine is recursively called as a child process.

Step S48 is executed following step S46 or step S47. In this step S48, the width is added to the pointer ofs indicating the starting position of the former half of the series so as to indicate the starting position of the latter half of the series. Next, one bit of the code word is input (step S49). This bit is the result of prediction of the latter half of the series. In step S50, the logic of the input code word is checked. If it is "0", the process advances to step S51, and if it is "1", the process advances to step S52.

The code word "0" here indicates that the prediction was on the mark. Accordingly, superior symbols are input into the latter half of the series, that is, from A[ofs] to A[ofs+width−1] (step S51). However, when the code word is "1", the process advances to step S52 and the size of the width is checked. If it is less than or equal to "1", there is no need to divide and predict further, that is, because the decoded bit is confirmed, the process moves to step S53 and an inferior bit is written into A[ofs]. When it is greater than or equal to 2, because further division and prediction is necessary, the decoding subroutine is called as a child process in step S54.

Next, the process of decoding binary bit strings is explained based on a specific example. Namely, the process of decoding is explained specifically using the encoded bit output 10, "1011010", obtained in the previous specific example of encoding a binary bit string. Moreover, in the same way as during encoding, decoding is executed having an initial prediction value, run, of 8 and a superior symbol of "0".

First, the initial encoded bit is input in step S32. Because this is "1", the process advances to step S35 and the size of the width is checked. Since the width is 8 at this time, the decoding subroutine is called in step S37. In this decoding subroutine, after the width is changed in step S40 to 4, the second encoded bit is input in step S41. Because this is a "0", the process advances to step S43, and "0"s are written into the former half of the series, that is, from A[0] to A[3]. After the ofs is changed to 4 in the following step S44, the process advances from step S52 to step S54. In this step S54, a child decoding subroutine is called as a child process.

In this child decoding subroutine, after the width is changed to 2 by further halving in step S40, the third encoded bit is input in step S41. Because this is "1", a grandchild decoding subroutine is called as a grandchild process in step S47, passing through step S45. In this grandchild decoding subroutine, after the width is changed to 1 in step S40, the fourth encoded bit is input in step S41. Because this is "1", the process advances to step S45. At this time, because the width is 1, the process advances to step S46, and 1 is written into A[4] here. After the ofs is changed to 5 in the following step S48, the fifth encoded bit is input in step S49. Because this is "0", the process advances to step S51, and "0" is written into A[5] here.

Subsequently, the process returns to the child decoding subroutine, and the ofs is changed from 4 to 6 in step S48. In the following step S49, the sixth encoded bit is input. Because this is "1", the process advances to step S54 passing through step S52, and a grandchild decoding process is again called as a grandchild process. In the grandchild decoding subroutine, after the width is first changed to 1 in step S40, the seventh encoded bit is input in step S41. Because this bit is "0", "0" is written into A[6] in step S43. In the following step S44, the ofs is changed to 7, and in step S53, because the width is "1", the process advances to step S53 and "1" is written into A[7].

Then, the process returns to the child decoding subroutine and decoding subroutine, and it further returns to the main decoding routine. In the main decoding routine, having returned thereto, resetting of the predicted run and resetting of the superior symbol are performed in step S38. Also, the decoded data is output from A[0] to A[7] in step S39.

The decoded data obtained by the process of decoding the binary bit string above is "00001001", being the original input bit series 1.

Figure 10:
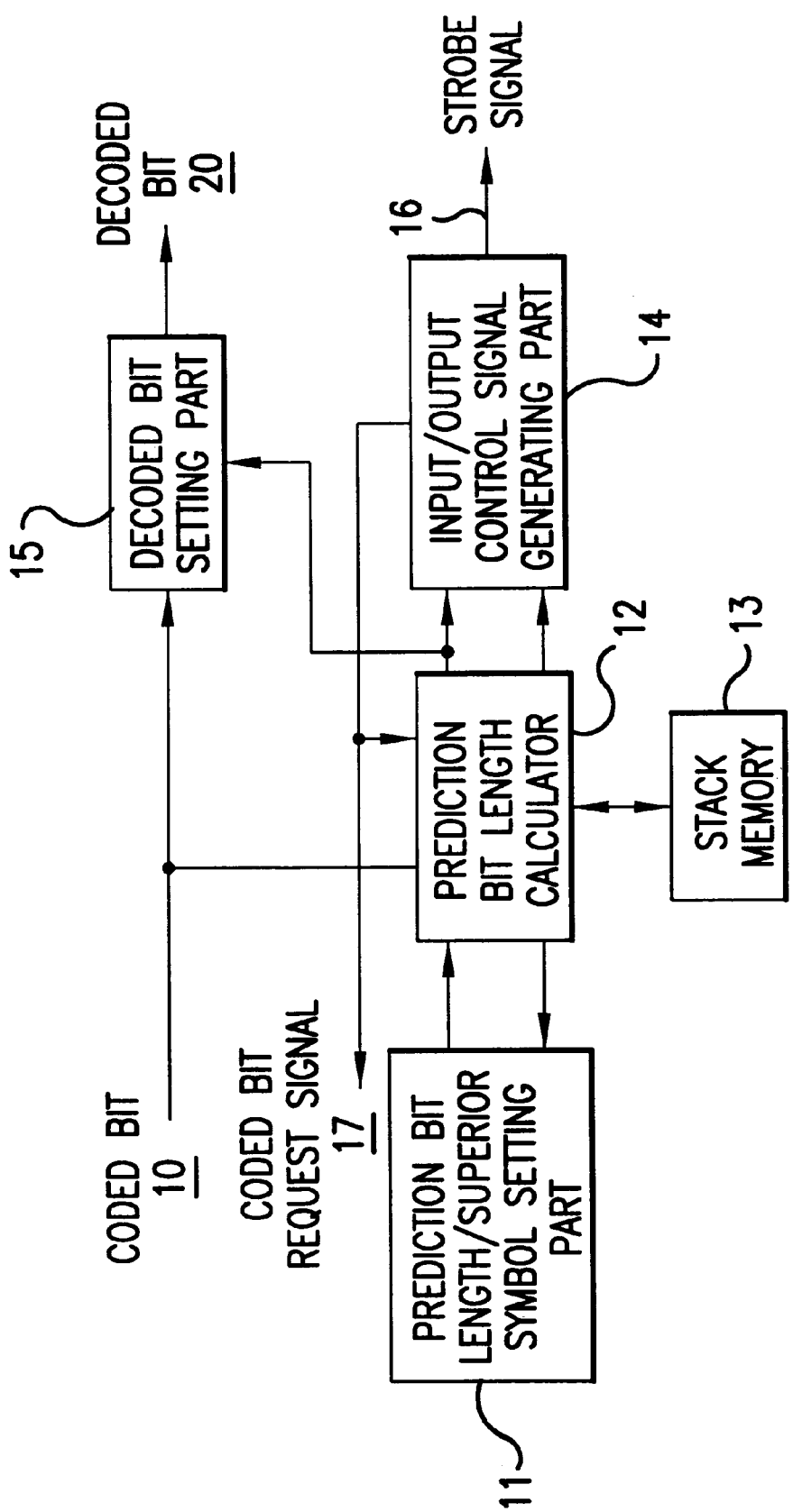
FIG. 10 is a block drawing showing the configuration of an embodiment of a data decoding device for predictive run-length encoding used in the invention.
Figure 11A:
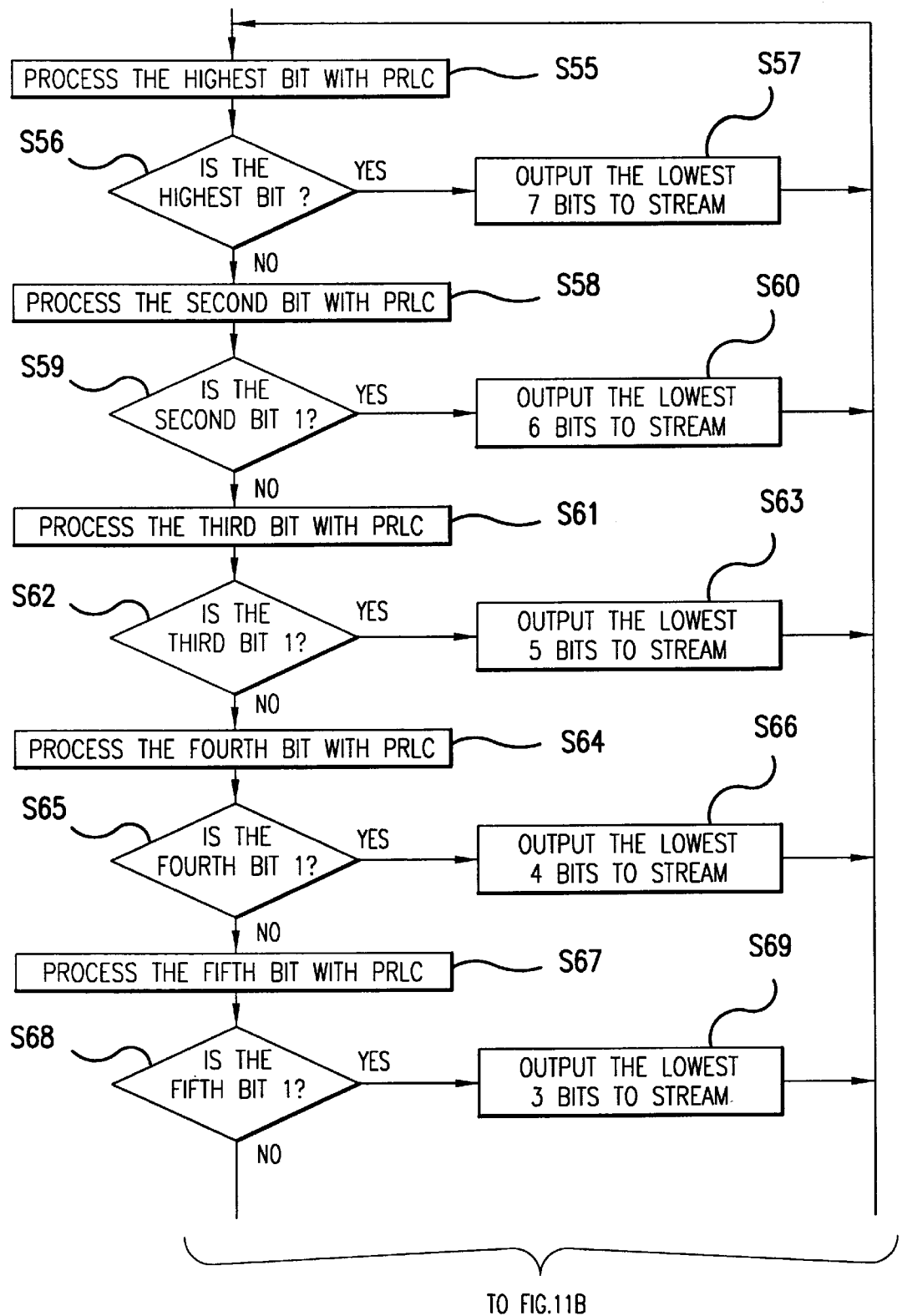
FIGS. 11A–B are a flow diagram showing the second method of data encoding method of multiple-valued information source of the invention.
Figure 11B:
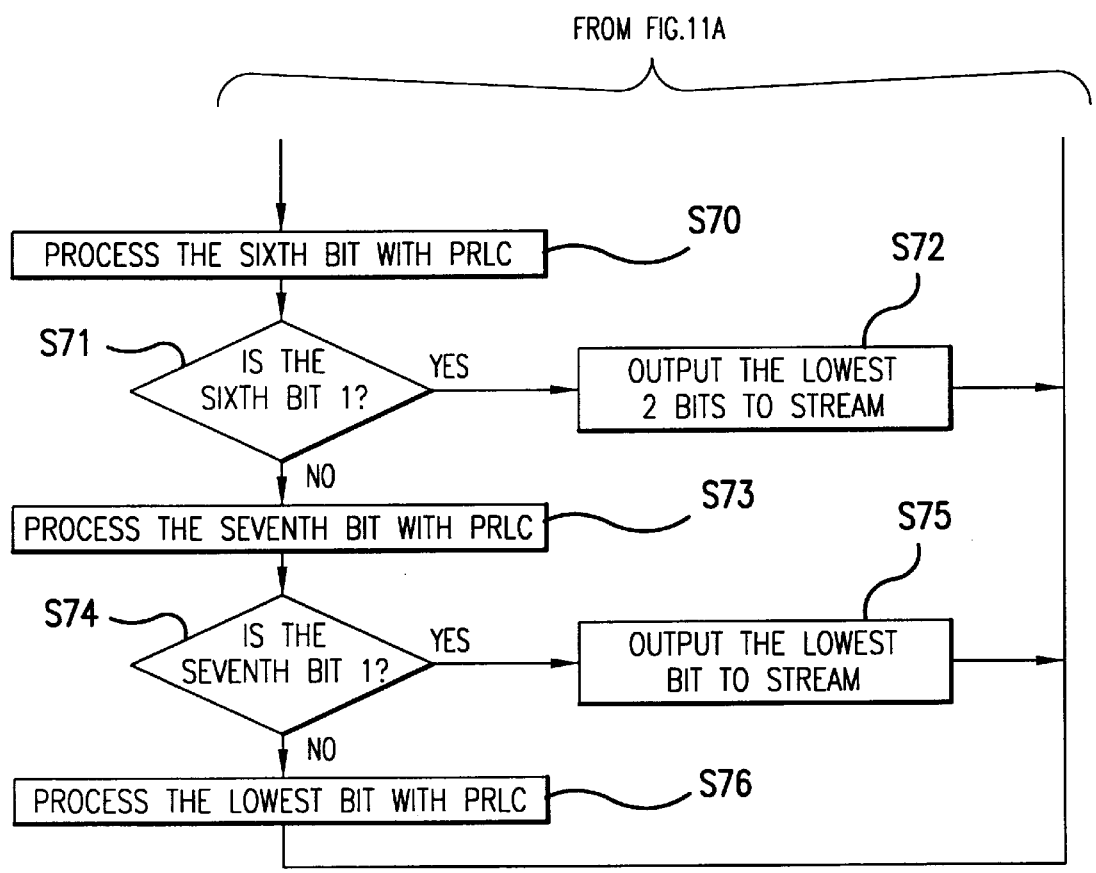
Figure 14A:
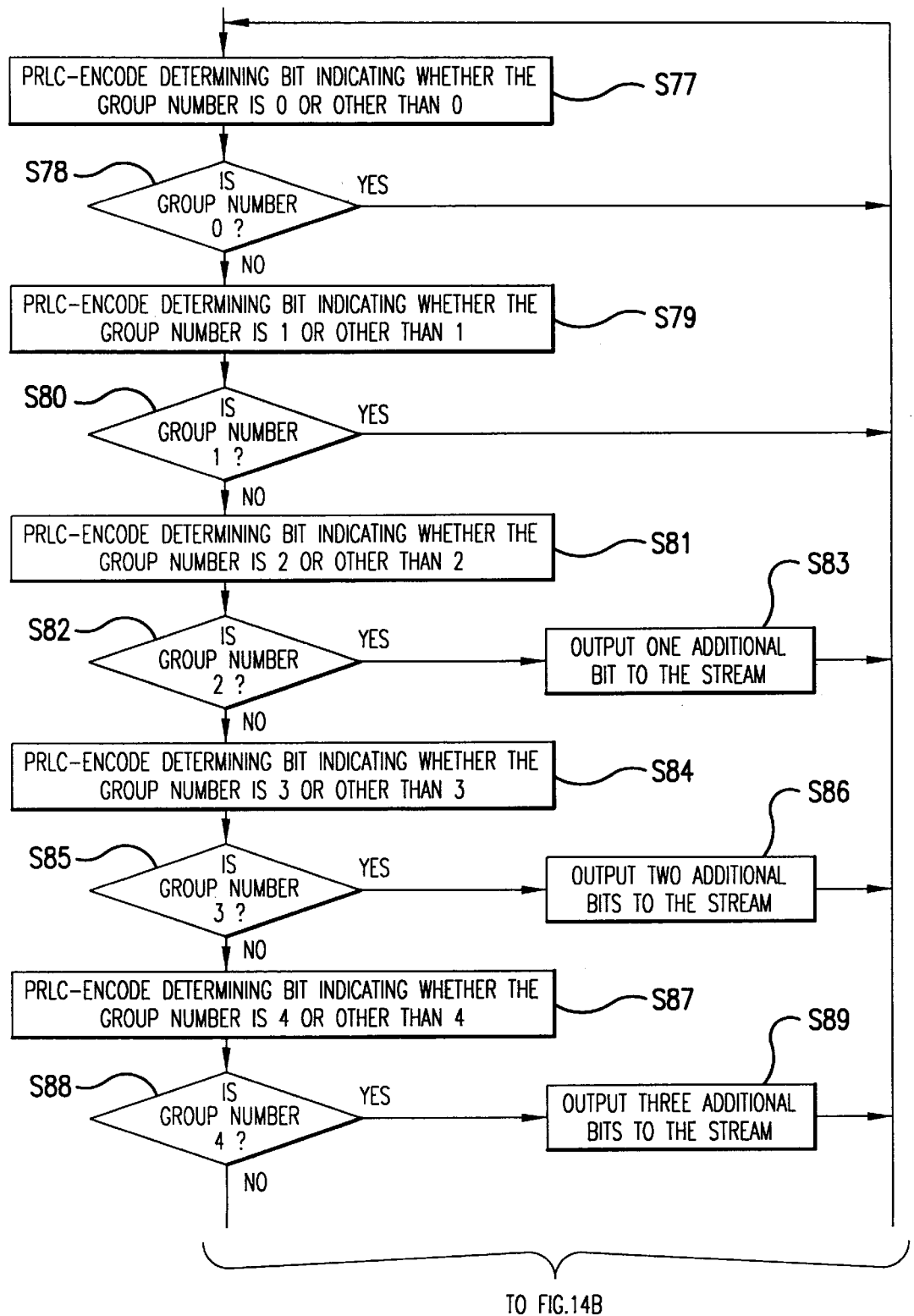
FIGS. 14A–B are a flow diagram showing the fourth method of data encoding of multiple-valued information source of the invention.
Figure 14B:
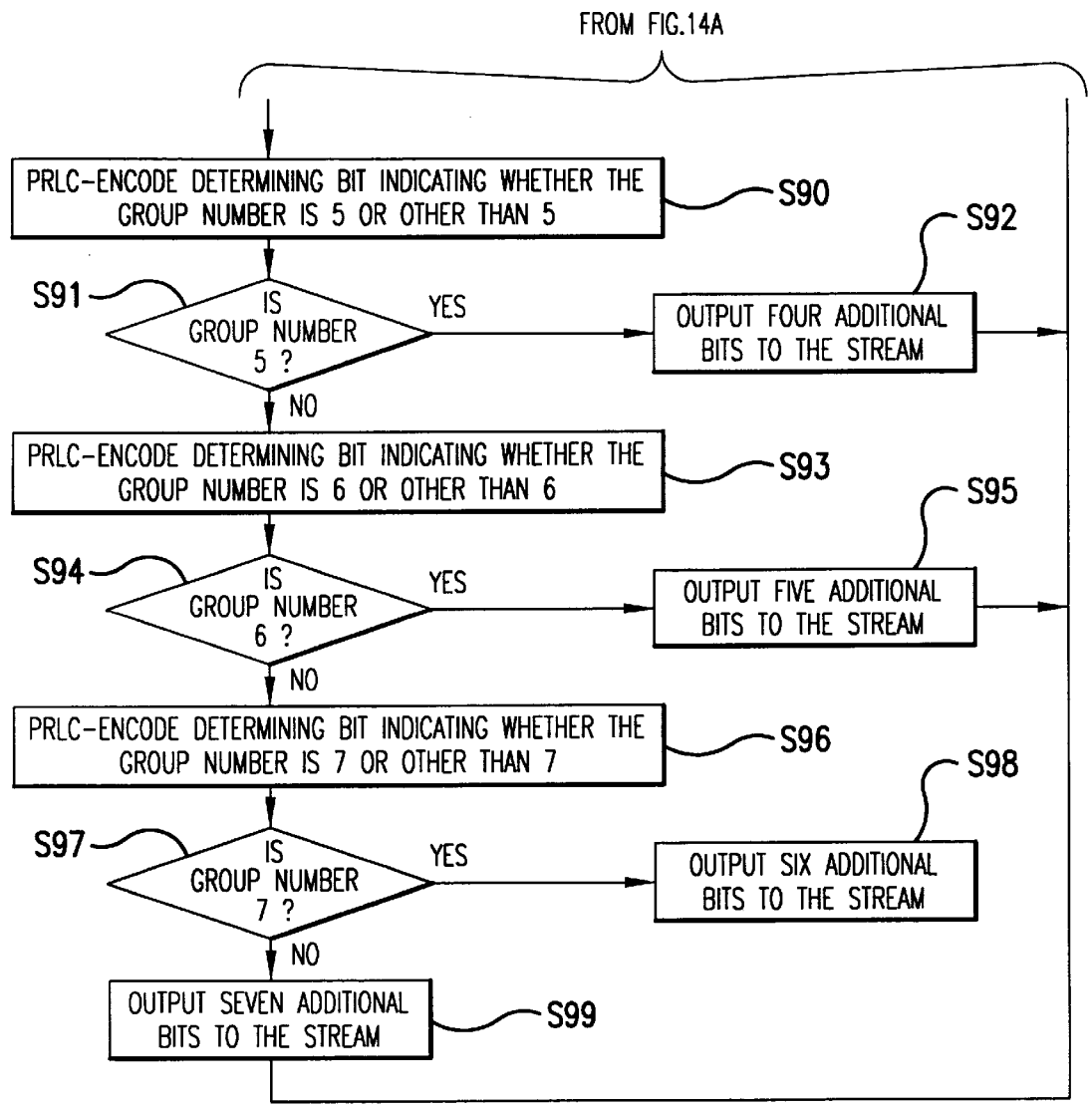

Next, a data decoding device of binary bit strings performing a process of decoding binary bit strings as the above is shown in FIG. 10.

This data decoding device for binary bit strings is constituted mainly by a prediction bit length/superior symbol setting part 11 for setting run, which is the prediction bit length, and the superior symbol; a prediction bit length calculator 12 having a register A and register B internally installed for holding the two variables, ofs and width; a stack memory 13 which is a memory for holding the value of the width changing moment by moment; an input/output control signal generator 14 for controlling input and output; and a decoded bit setting part 15 for setting the decoded bits.

Here, prediction bit length/superior symbol setting part 11 inputs the status of the past decoding (to what degree the prediction was correct, or to what degree it has failed, and the like) from prediction bit length calculator 12, and sets run, the prediction bit length, of the newly input encoded bits 10 and the superior symbol. The prediction bit length, run, is input into prediction bit length calculator 12 and a superior symbol setting signal is input into decoded bit setting part 15.

Prediction bit length calculator 12 has a register A and register B internally installed for holding the two variables, ofs and width, as described above. Width is set to the bit length, run, for the first prediction output by prediction bit length/superior symbol setting part 11, and ofs is initialized to 0. Register B, that is, the value of width, is supplied to input/output control signal generator 14. However, after initialization, when the input encoded bit 10 is "1" and the width is 2, the width is halved and is written into stack memory 13. However, when the width is 1, a decoded bit output permission signal is output to decoded bit setting part 15 and to input/output control signal generator 14, and at the same time, the width in register B is added to the ofs in register A. Subsequently, the width just written is read out from stack memory 13, and it is maintained in register B.

Also, when the encoded bit 10 is "0", a decoded bit output permission signal is output to decoded bit setting part 15 and to input/output control signal generator 14, and at the same time, the width in register B is added to the ofs in register A. Subsequently, the width just written is read out from stack memory 13, and it is maintained in register B. Also, the ofs gradually becomes greater as the decoding advances. Then, when this ofs becomes equal to run, a signal indicating that decoding of one predicted unit of encoded bits 10 is completed is generated, and this signal is output to prediction bit length/superior symbol setting part 11. Receiving this signal, prediction bit length/superior symbol setting part 11 performs resetting of the prediction bit length, run, and resetting of the superior symbol for the next encoded bits 10.

Stack memory 13 is a memory for maintaining the value of the width changing moment by moment as described above, and it is a so-called first-in-last-out memory. That is, it is a memory that outputs last a value written in first. Stated conversely, it is a memory that outputs first a value written in last.

Input/output control signal generator 14 is a block for generating a strobe signal 16 indicating that valid decoded bits are being output. Upon receiving a decoded bit output permission signal from prediction bit length calculator 12, strobe signals 16 are output in a period specified by the width at that time. Also, when strobe signals 16 become active for two or more cycles, an encoding bit request signal 17 is deactivated from the second cycle, and operation of prediction bit length calculator 12 is temporarily stopped at the same time as controlling the input of new encoded bits 10.

Decoded bit setting part 15 is constituted by a register for temporarily holding encoded bits 10 being input during the time of having received a decoded bit output permission signal from prediction bit length calculator 12. Also, it reverses the decoded bits 20 according to need following instruction from prediction bit length/superior symbol setting part 11.

The decoding process described above is executed by a data decoding device for binary bit strings configured as above. The decoding time when using this decoding process is extremely short compared with a QM coder, in the same manner as the encoding times shown in FIG. 7. Specifically, because the process of decoding binary bit strings uses the reverse algorithm of the encoding process, if the encoding time is shortened, the decoding time is also shortened.

Such encoding and decoding of binary bit strings can be said to be a predictive run-length encoding method and decoding method. Also, this predictive run-length coding (henceforth, PRLC) can be applied to a multiple-valued information source, and that application is explained below.

A multiple-valued information source generally has different occurrence probabilities of "0" and "1" for each bit plane, and even when simply converting the multiple-valued information source into binary, because they are handled indiscriminately in this PRLC, encoding with good efficiency is not possible. Thus, a first method of multiple-valued predictive run-length encoding (multiple-valued PRLC) is considered, whereby the multiple-valued information source is divided into bit planes, that is, it is divided into eight bit planes, for example, in the case of an eight-bit multiple-valued information source, and the data of each bit plane is encoded variously. This method shows a high efficiency of encoding in simulations as well.

In this first method of multiple-valued PRLC, which performs division into bit planes, the degree of correlation between planes is ignored, and the efficiency is somewhat inferior compared with the case when a QM coder is used. Thus, when considering that each value of a multiple-valued information source is concentrated in the lower bits, a second method of multiple-valued PRLC is considered as follows.

The second method of multiple-valued PRLC applies PRLC to each bit plane in the same manner as the first method. However, PRLC is performed for each plane from the highest bit. Also, at the point when a "1" appears, the following lower bits are directly output into the stream. This second method is explained based on a specific example in the flow chart of FIGS. 11 and 12.

When the input symbols to become the multiple-valued information source are, for example, [0], [1], [9], [23], [60], [224], [0], [3], and so on, as shown in FIG. 12, the highest bit plane becomes "000000100 . . . " Also, this highest bit plane is encoded by a specified prediction bit length, run, according to the PRLC shown before (step S55). At this time, it is confirmed as to whether or not a "1" appears (step S56), and for the input symbol [224], where a "1" appeared, "1100000", being the values on the lower seven bit planes, are output directly into the stream (step S57) and encoded.

Next, for the highest bits that are not "1", their second bits are PRLC-encoded (step S58). In the specific example of FIG. 12, it becomes "00000000 . . . " PRLC-encoded. At this time, because the second bit "1" of [224] was already output, it is skipped. Also, the number of run, being the prediction bit length, during performing of PRLC becomes a value determined unrelated to and independent of the number of the prediction bit length used for the highest bits. Here, whether or not there is a "1" is detected in the second bits (step S59), and if there is a "1", the lower six bits are output into the stream (step S60). In the specific example of FIG. 12, because there is no "1", step S60 is not performed, and the third bits next now are PRLC-encoded with a still independent prediction bit length, run (step S61).

Also, it is confirmed as to whether or not there is a "1" in the third bits (step S62). At this time, the third bits have become "00000100 . . . ", and for the symbol [60], the lower five bits "11100" are output into the stream as they are (step S63). Subsequently, the fourth bits not having a third bit "1" are PRLC-encoded with an independent prediction bit length, run (step S64). Also, it is confirmed as to whether or not there is a "1" in the fourth bits (step S65). At this time, the fourth bits have become "0000100 . . . ", and for the symbol [23], the lower four bits "0111" are output into the stream as they are (step S66).

Following a similar flow, the fifth bits, sixth bits, seventh bits, and lowest bits variously are PRLC-encoded with independent prediction bit lengths, run (step 67 to step S76). In the example of FIG. 12, in the PRLC of the lowest bits in step S76, the "0" of the input symbol [0] and the "1" of the following [1] is the object, but the lowest bits of the following input symbols, [4], [9], [60], and [224], have already been output and are outside the object. Also, the "0" of the following [0] is the object, and the next [3] is outside the object. Moreover, when encoding each bit plane, when the number of bits meeting the conditions applicable inside the buffer does not satisfy run, being the prediction bit length, encoding is performed by inserting dummy superior symbols in the amount of the insufficiency. In this case, on the side of decoding, excess superior symbols are decoded, but if the capacity of the buffer is already known during encoding, it can be determined as to whether the decoded bits are meaningful or whether they were inserted as dummies. In order to avoid a method using such dummy superior symbols, the buffer may be made sufficiently large, and furthermore, it can be made to have just enough capacity so that the entire file to be compressed can be stored.

Next, a third embodiment of multiple-valued PRLC for which a further increase in efficiency can be expected is described. This method utilizes the fact that the performance capacity of PRLC and QM coders is substantially absent vis-á-vis compression rate when handling a memoryless information source as described earlier. Namely, attention has been given to the argument that a similar compression rate as that of a QM encoder should be obtainable if the Markov model used by a QM coder is skillfully applied to PRLC. In the case of a QM coder, a probability estimate table is drawn according to context, and the occurrence probability of the inferior symbol is sought. However, when this is applied to PRLC, this corresponds to creating a plurality of series by classifying the encoded symbols for each context, and performing PRLC separately on each of those series. In short, if encoding is performed by dividing into level planes (corresponding individually to different values of the multiple-valued information source) rather than bit planes, a further increase in efficiency of compression is achieved.

That is, bias occurs in the occurrence rates of the various input symbols, but this bias becomes a factor raising efficiency of compression when the various input symbols, that is, level planes, are encoded. For example, in the case of four-bit input symbols, there are a total of sixteen types of input symbols assuming that "0001" occurs at a probability near 0 and "1010" occurs at a probability near 1. Thus, while the input symbol "0001" comes to have many "0"s continue in the frequency of occurrence, however, the input symbol "1010" comes to have many "1"s continue in the frequency of occurrence. As a result of this, the compression rate becomes raised by using PRLC.

The third method of multiple-valued PRLC described above is not relevant when the number of bits of the input symbols is small, and it becomes a problem that the memory becomes large when <the number of symbols> becomes many. For example, in the case of eight-bit input symbols, the number of level planes becomes 256, and management of the prediction bit lengths, run, for each plane and management of prediction of how many input symbols to accumulate in the buffer, and the like, become severe. In addition, the memory required for data management becomes great, and the device becomes excessively larger in scale, thereby increasing cost significantly. Next, a fourth method of multiple-valued PRLC which solves this problem is explained.

First, the input symbols to be input are converted using the leading position-switching dictionary method <Translator's note: See 0138 below.>, and those inputs having a bias of occurrence probability are taken. That is, those having a bias toward the lower bits or the higher bits are taken. This bias in occurrence probability is caused, in addition, by quantization coefficients, such as DPCM and IHT, including DCT. In any case, the input symbols are made to have probability concentrated in the lower bits or higher bits, or the like, or input symbols concentrated in that manner are handled. Also, level planes having concentrated probability are handled independently and those having low concentration of probability are compiled into a plurality of level planes. Thus, on the one hand increase in memory can be prevented, while on the other hand, the decreased efficiency of compression can be held to a minimum.

Figures 15, 16:
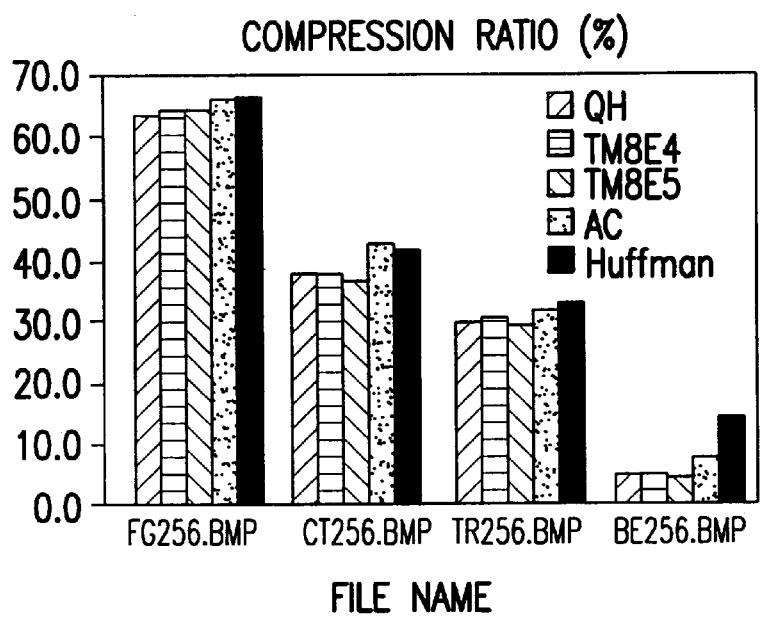
FIG. 15 is a drawing illustrating the specific operation of the fourth method shown in FIG. 14.
FIG. 16 is a chart showing the compression rates using the second method and fourth method of data encoding of multiple-valued information source of the invention compared with conventional methods.

FIGS. 13 and 15 show the fourth embodiment of the multiple-valued PRLC. This specific example is well-suited to the instance when the input symbols are concentrated in the lower bits, in the same manner as in the second method. In the fourth embodiment of multiple-valued PRLC, the input symbols are first divided into groups. For example, in the case of eight-bit symbols, the input symbols are divided into nine groups as shown in FIG. 13. Also, these group numbers (to describe it more in more detail, the bits determining whether or not an input symbol belongs to a group as described below) are PRLC-encoded. The specific method of this PRLC is described based on the flow chart shown in FIG. 14 and the specific example shown in FIG. 15.

For example, when the input symbols to become a multiple-valued information source are [0], [1], [4], [9], [23], [60], [224], [0], and [3], as shown in FIG. 15, because the first input symbol [0] belongs to the group [0], the bit determining whether or not it belongs to the group number [0] is a "0" which indicates that it belongs to the group. Also, because [1] is not group number [0], the bit determining part of group number [0] becomes "1", and the bit determining group number [1] becomes "0". Continuing, the bits determining [4] become "1110", the bits determining [23] become "111110", the bits determining [60] become "1111110", and the bits determining [224] become "11111110".

The determining bits as described above are PRLC-encoded. The order of this specific example is that first the bit determining whether or not an input symbol belongs to group number [0] is PRLC-encoded (step S77). In the example shown of FIG. 15, the series of determining bits, "011111101 . . . ", shown on the topmost line is PRLC-encoded with an independent prediction bit length, run. Also, it is determined as to whether or not there is one that belongs to group number [0] (step S78). If there is a "0", because that value means that the input symbol is [0], encoding is completed. Therefore, encoding of the first and eighth input symbols [0] is completed. When there is one for which the group number is not "0", the bit determining whether or not it belongs to group number [1] is PRLC-encoded (step S79). In the example of FIG. 15, the series of determining bits, "0111111 . . . ", shown on the second line is PRLC-encoded with an independent prediction bit length, run.

Also, it is determined as to whether or not there is one that belongs to group number [1] (step S80). If there is one that belongs to this group number [1], encoding is completed. Here, because the pertinent code is "0", the second input symbol [1] belongs. Thus, encoding of the input symbol [1] is completed.

Next, if there still exists one for which the group number is not [1], it is determined as to whether or not there is one that belongs to the group number [2] (step S81). In the example of FIG. 15, the series of determining bits, "111110 . . . ", corresponding to the input symbols, [4], [9], [23], [60], [224], and [3], is PRLC-encoded with an independent prediction bit length, run. Also, it is confirmed whether or not there is one that belongs to group number [2] (step S82). If there is one that belongs to group number [2], an additional one bit, "0" or "1", is output into the stream (step S83), and encoding is completed. In the example shown of FIG. 15, the ninth input symbol [3] belongs, and an additional bit "1" is output into the stream. Moreover, when the input symbol is [2], the group number becomes [2], being the same as with the input symbol [3], but the additional bit becomes "0".

Next, if there still exists one for which the group number is not [2], the determining bit indicating whether or not there is one that belongs to group number [3] is PRLC-encoded (step S84). In the example shown in FIG. 15, the determining bit string, "01111 . . . ", is PRLC-encoded with an independent prediction bit length, run. Also, it is determined whether or not there is one that belongs to group number [3] (step S85). If there is one that belongs to group number [3], any of the two additional bits, "00", "01", "10", "11", is output into the stream (step S86). In the example shown in FIG. 15, the third input symbol [4] belongs, and the additional bits "00" are output into the stream. Moreover, when the input symbol is [5], the additional bits become "01", "10" when [6], and "11" when [7].

Processing below is executed according to a similar flow (step S87 to step S99). That is, the determining bits indicating whether or not there are any belonging to group numbers [4], [5], [6], and [7] variously are PRLC-encoded (steps S87, S90, S93, and S96), and when there are pertinent numbers, three-bit, four-bit, five-bit, and six-bit additional bits are output into the stream (steps S89, S92, S95, and S98). Lastly, if there exists one that is not group number [7], seven additional bits are output into the stream (step S99), and one cycle of encoding is completed.

The fourth embodiment of the multiple-valued PRLC has improved processing speed in comparison with the second embodiment. This occurs in the fourth embodiment because from the time the group number is confirmed, encoding of the higher determining bits is not performed. On the other hand, in the fourth embodiment, when encoding the determining bits of each group number, if the number of bits meeting the conditions pertaining to the buffer does not satisfy run, which is the prediction bit length, encoding is performed by inserting dummy superior symbols for the amount of the insufficiency, as in the second embodiment method. In this case, on the encoding side, excess superior symbols are encoded, but if the capacity of the buffer is already known during encoding, it can be determined whether the decoded bits are meaningful or whether they were inserted as dummies. In order to avoid a method using such dummy superior symbols, the buffer may be made sufficiently large, and furthermore, it can be made to have a capacity large enough so that the entirety of the file to be compressed can be stored.

Figure 17:
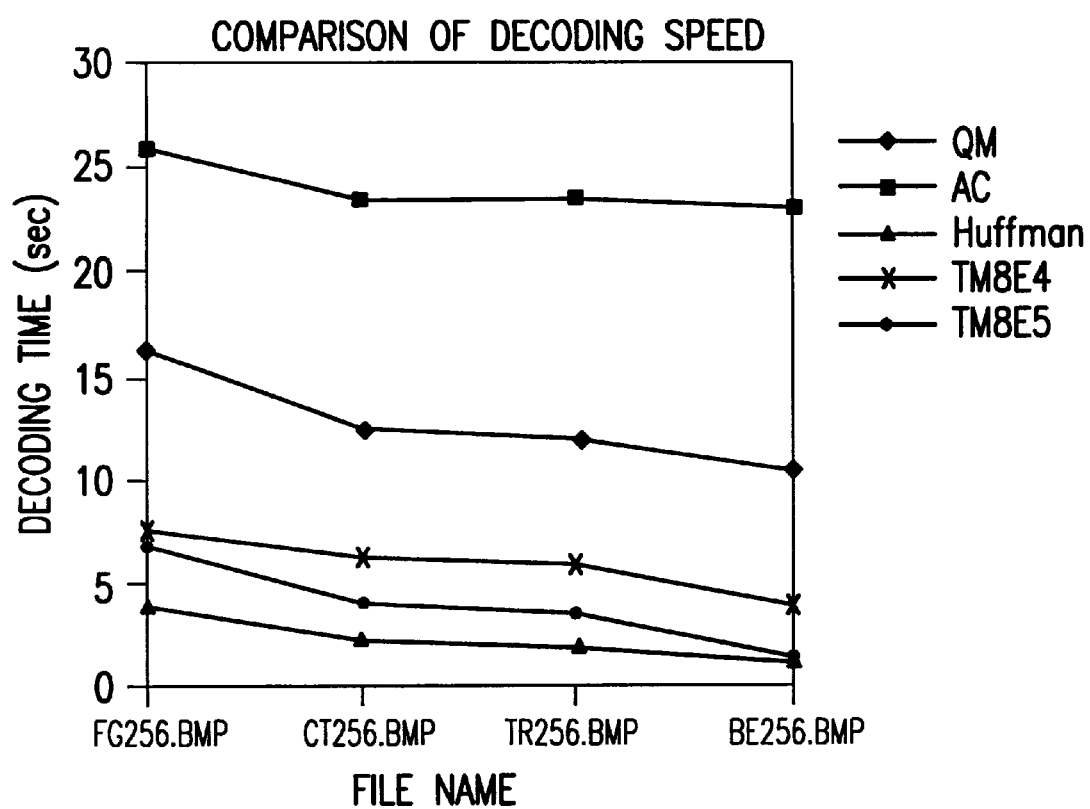
FIG. 17 is a table showing the processing times required for decoding using the second method and fourth method of data encoding of multiple-valued information source of the invention compared with conventional methods.
Figure 18:
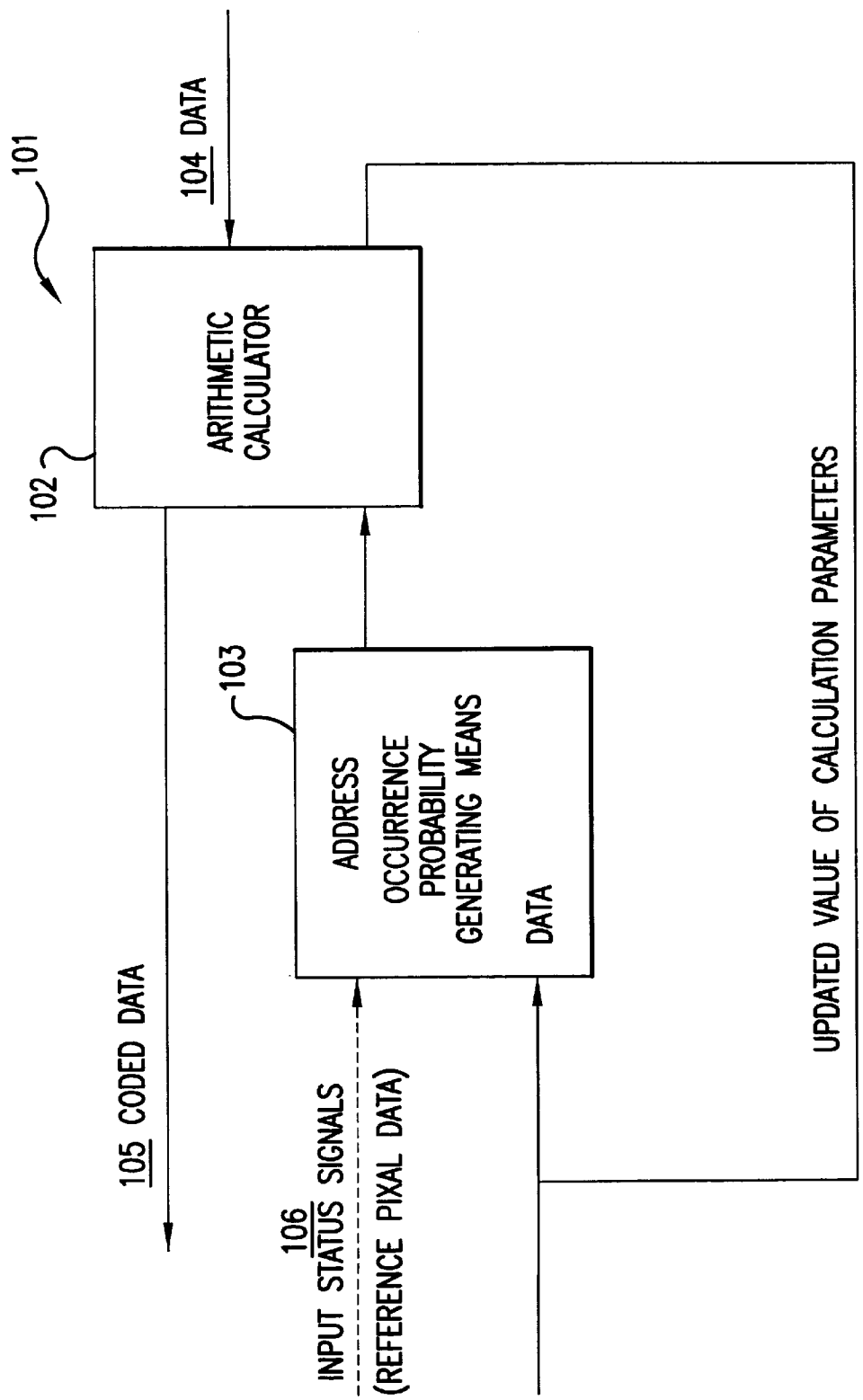
FIG. 18 is a drawing showing the configuration of a QM coder, which is a conventional arithmetic-type entropy encoding device.
Figure 19:
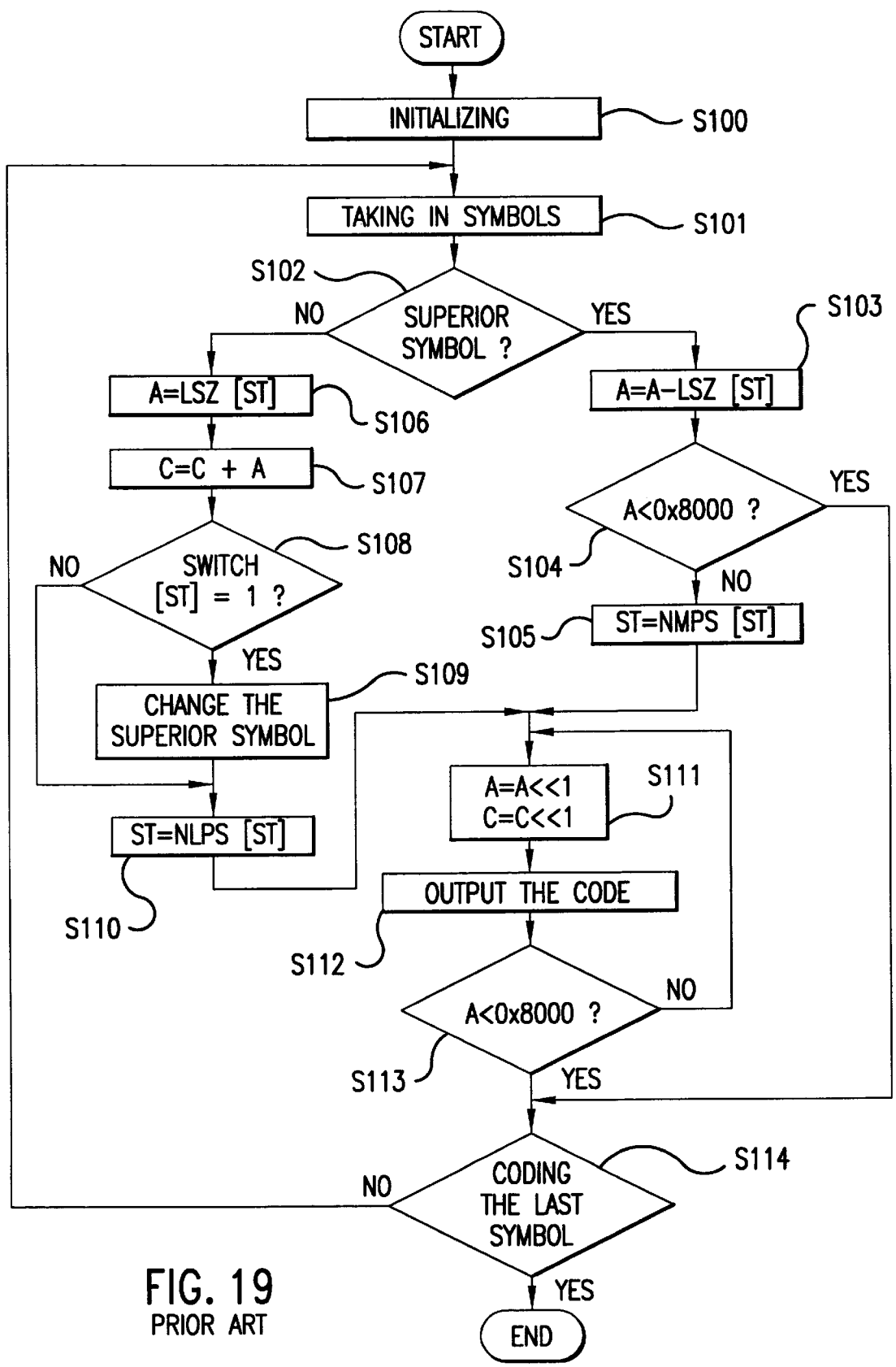
FIG. 19 is a flow chart showing the operation of the QM coder of FIG. 18.

Data comparing each of the above embodiments with conventional methods are shown in Table 1 and Table 2, as well as in FIG. 16 and FIG. 17. FIG. 16 is a graph of Table 1 showing the comparison of compression rates. FIG. 17 is a graph of Table 2 showing a comparison of processing speed.

| Comparison of Compression Rate (%) | | | | | |
| --- | --- | --- | --- | --- | --- |
| File Name | Size (byte) | QM | TM8E4 | TM8E5 | AC | Huffman |
| FG256.BMP | 85560 | 64.0 | 64.1 | 64.1 | 66.0 | 66.4 |
| CT256.BMP | 77880 | 37.5 | 37.5 | 36.6 | 42.5 | 42.3 |
| TR256.BMP | 71140 | 29.7 | 30.6 | 29.6 | 32.0 | 32.6 |
| BE256.BMP | 76901 | 5.9 | 5.7 | 4.9 | 8.1 | 15.3 |

| Comparison of Decoding Speed (seconds) | | | | | |
| --- | --- | --- | --- | --- | --- |
| File Name | QM | TM8E4 | TM8E5 | AC | Huffman |
| FG256.BMP | 15.94 | 7.49 | 6.43 | 25.75 | 3.59 |
| CT256.BMP | 12.26 | 6.07 | 3.88 | 23.23 | 2.20 |
| TR256.BMP | 11.78 | 5.69 | 3.47 | 23.46 | 1.99 |
| BE256.BMP | 10.31 | 3.94 | 1.44 | 23.12 | 1.16 |

For comparison of the source files, multiple-valued information sources having an indexed 256-color image bit map file and using a leading position-switching dictionary method were used. Here, the leading position-switching dictionary method establishes 256 dictionaries having entropy of 256 and switches the dictionaries by the immediately preceding encoded symbol, and the leading position-switching of a dictionary has the leading position switched halfway. Also, used as the conventional methods are the three methods, "QM," having directly encoded eight-bit indices using a QM coder, "AC," having encoded multiple-valued data as is using arithmetic encoding, and "Huffman," using two-pass Huffman encoding. Used as the methods of the present invention are "TM8E4," being the second method of multiple-valued PRLC described above, and "TM8E5," being the fourth method described above.

Both "TM8E4" and "TM8E5" have the initial value of the prediction bit length, run, defined as 1, and the maximum value of the prediction bit length, run, defined as 256. Also, the condition for doubling the prediction bit length, run, occurs when the predictions have been on the mark for two or more consecutive times, and the condition for halving run occurs when prediction has failed. Furthermore, the condition for changing the superior symbol occurs when the prediction bit length, run, is 1 and the prediction has failed.

Each of the above embodiments is a preferred embodiment of the present invention. However, the invention is not limited to these embodiments, and various modified embodiments are possible within the scope of the principles of the present invention. For example, "1" rather than "0" can be defined as the code word when a prediction was correct. Also, the superior symbol may be output when a prediction was correct, and the inferior symbol may be output when a prediction has failed. Also, the newly reduced prediction bit number can be made one third, one fourth, etc., of the original prediction bit number, rather than one half, and it can be made a number having subtracted a specified number, from the original prediction bit number. However, the newly increased prediction bit number can be made three times or four times, etc., the original prediction bit number, rather than twice, and can be made a number having added a specified number, to the original prediction bit number.

Moreover, the newly increased prediction bit number may also have a specified multiple of two, for example, 256 bits, as a maximum value, rather than being defined as infinite. Also, it may also be made such that a number such as, 2 or 3, rather than 1, as the minimum value of the newly reduced prediction bit number.

Also, in the dividing and encoding process, the bit series may also be divided into three, four, five, etc., and it may be divided such that the former half of the series and the latter half of the series are unequal. Furthermore, the recursion of division, upon failure of prediction may terminate at a number of bits, such as 2 or 3, rather than being performed up to the number of bits becoming 1. After that, the input bit series may be output as it is, and it may also be encoded by a QM coder.

Furthermore, in the embodiments described above, when prediction has failed, encoding of the former half was performed first by observing the former half, and encoding of the latter half was performed next. However, encoding and decoding may also be performed from the latter half first. That is, all encoding and decoding may also be performed with preference to the latter half. Also, encoding and decoding may be performed by making the preferred part the former half and making it the latter half.

Furthermore, in the embodiments described above, coding was performed by predicting that the observed series defined by the prediction bit number, run, would be entirely of superior symbols, outputting "0", for example as a code word when the prediction was correct, and outputting "1", and the like, as a code word, further dividing the series into two, and performing similar operation until the prediction is on the mark or division becomes impossible when the prediction has failed. However, when the prediction bit number is comparatively short, for example, when it is 1, 2, 4, 8, encoding may be performed by preparing an encoding table in advance and encoding in one cycle by referring to that table. For example, in a case when the prediction bit number is 2 and the superior symbol is "0", when the input bit series 1 is "00", the encoded bit 10 becomes "0", and "01" becomes "10", "10" becomes "110", and "11" becomes "111". Therefore, these relationships may be prepared in advance as an encoding table. By exchanging such a method, the time of encoding can be further shortened. In this case, if encoding is performed by selecting an encoding table according to the prediction bit number, run, encoded bits 10 similar to those of the embodiments described above can be obtained. Also, by preparing a decoding table in the same manner during decoding, and by referring to the table selected by the prediction bit number, run, decoding can be performed having shortened the time of decoding.

As above, while the application of the invention to a multiple-valued information source is naturally not limited to the case of encoding data, it can be applied also to the case of decoding data by using a similar algorithm. Also, the second method and fourth method of multiple-valued PRLC can also be applied to ordinary run-length encoding rather than PRLC.

What is claimed is:

1. A data encoding method of a multiple-valued information source, comprising the steps of:

a prediction setting process defining either "0" or "1" as a superior symbol and the other as an inferior symbol, when a multiple-valued information source that includes a plurality of bits is divided into bit planes and a binary bit string that includes "0"s and "1"s of each bit plane is input, predicting the superior symbol to continue for n units, and setting the n units as a prediction bit number; and a prediction result output process outputting either signal of "0" or "1" as a prediction correct signal, as a code word, when prediction is correct for an observed series that includes the prediction bit number input, encoding the next string of n bits, and outputting the other of either "0" or "1" as a prediction failed signal, as a code word, when the prediction has failed in the encoding operation; wherein another prediction setting process and prediction result output process are recursively iterated, setting a newly-decreased prediction bit number as a prediction bit number less than n units when the prediction has failed a specified number of times.

2. The data encoding method according to claim 1, wherein said n units is an even number;

said observed series is halved when said prediction has failed for a specified number of times;

said newly-decreased prediction bit number is made one half of said prediction bit number when an inferior symbol exists in only the former half of the halved observed series;

and said newly-decreased prediction bit number is made one fourth of said prediction bit number when an inferior symbol exists in only the latter half of the halved observed series.

3. The data encoding method according to claim 2, wherein when said newly-decreased prediction bit number is 1 and when that bit is an inferior symbol, encoding is performed in subsequent encoding by setting the original inferior symbol as the superior symbol and setting the original superior symbol as the inferior symbol.

4. The data encoding method according to claim 3, wherein said specified number of times is set to one time.

5. The data encoding method according to claim 4, wherein said prediction bit number is set to a newly-increased prediction bit number greater than said prediction bit number.

6. A data encoding method of a multiple-valued information source, comprising the steps of:

a prediction setting process defining either "0" or "1" as a superior symbol and the other as an inferior symbol, when a multiple-valued information source that includes a plurality of bits is divided into bit planes and a binary bit string that includes "0"s and "1"s of each bit plane is input, predicting the superior symbol to continue for n units, and setting the n units as a prediction bit number; and a prediction result output process outputting either signal of "0" or "1" as a prediction correct signal, as a code word, when prediction is correct for an observed series that includes the prediction bit number input, encoding the next string of n bits, and outputting the other of either "0" or "1" as a prediction failed signal, as a code word, when the prediction has failed in the encoding operation; wherein another prediction setting process and prediction result output process are recursively iterated, setting a newly-increased prediction bit number as a prediction bit number more than n units when the prediction is correct for a specified number of times.

7. The data encoding method according to claim 6, wherein said specified number of times is two times; and said newly-increased prediction bit number is made two times said prediction bit number.

8. The data encoding method according to claim 7, wherein said n units is made $2^m$, where m is an integer greater than or equal to 0.

9. The data encoding method according to claim 8, further comprising the steps of:

a former-half-correct process halving said observed series when said prediction has failed, outputting "0" as a code word when the former half of the halved observed series is all superior symbols, further halving the latter half of the observed series, and outputting a code word of "0" or "1"; and a former-half-failed process outputting "1" as a code word when there exists said inferior symbol in the former half of the halved observed series, further halving the former half of the observed series, and outputting a code word of "0" or "1"; wherein said former-half-correct process and said former-half-failed process are recursively iterated, repeating division of that observed series as long as there exists an inferior symbol in each divided observed series.

10. The data encoding method according to claim 8, further comprising the steps of:

a latter-half-correct process halving said observed series when said prediction has failed, outputting "0" as a code word when the latter half of the halved observed series is all superior symbols, further halving the former half of the observed series, and outputting a code word of "0" or "1"; and a latter-half-failed process outputting "1" as a code word when said inferior symbol exists in the latter half of the halved observed series, further halving the latter half of the observed series, and outputting a code word of "0" or "1"; wherein said latter-half-correct process and said latter-half-failed process are recursively iterated, repeating division of that observed series as long as there exists an inferior symbol in each divided observed series.

11. A data encoding method of a multiple-valued information source according to claim 1, wherein a multiple-valued information source that includes a plurality of bits is divided into bit planes, the bit planes are encoded from the bit plane of the highest bit by a data encoding method as defined in claim 1, and the following lower bits are output as code bits at the point when a "1" has appeared.

12. A data encoding device of a multiple-valued information source for dividing a multiple-valued information source that includes a plurality of bits into bit planes and compressing a binary input bit series that includes "0"s and "1"s of each bit plane, comprising a prediction bit length equivalent calculating and setting part for setting either of "0" or "1" as a superior symbol, setting the other of either as an inferior symbol, predicting the superior bit to continue for n units, and setting the n units as a prediction bit number;

a buffer register for temporarily storing the input bit series; and a determining part for inputting each value of the prediction bit length equivalent calculating and setting part and the buffer register, outputting either signal of "0" or "1" as a prediction correct signal, as a code word, when prediction is correct for an observed series that includes the prediction bit number input, and outputting the other of either "0" or "1" as a prediction failed signal, as a code word, when the prediction has failed in the encoding operation; wherein a newly-decreased prediction bit number as a prediction bit number less than n units is set by the prediction bit length equivalent calculating and setting part when the prediction has failed a specified number of times, and a newly-increased prediction bit number a prediction bit number more than n units is set by the prediction bit length equivalent calculating and setting part when the prediction was correct for a specified number of times.

13. A data encoding device of a multiple-valued information source, comprising:

a buffer register that includes a group of registers for dividing a multiple-valued information source that includes a plurality of bits into bit planes and temporarily storing the input bit series of each bit plane;

a prediction bit length calculating part installed inside a register for holding a variable, ofs, indicating the leading position of the observed series to encode and a register for holding a variable, width, indicating the prediction bit length;

a determining part for selecting an input bit series on the buffer register determined by the width from the position of the ofs and the ofs on the buffer register output by this prediction bit length calculating part, outputting one superior symbol as a code bit output when that input bit series is all superior symbols, and outputting one inferior symbol when an inferior symbol is included;

an input/output control signal generating part for performing an input bit request when a completion signal indicating that encoding of the input bit series inside the buffer register was completed was received from the prediction bit length calculating part; a stack memory to become a memory for holding the values of the width, which changes moment by moment; and a prediction bit length/superior symbol setting part for inputting the status of the past encoding by the prediction bit length calculating part and setting a prediction bit length and superior symbol of the input bit series newly input; wherein the input/output control signal generating part instructs to acquire an input bit series having a number of units indicated by the new prediction bit length newly set by the prediction bit length/calculation superior symbol setting part when the completion signal was received from the prediction bit length calculating part.

14. A data decoding method of a multiple-valued information source for restoring a multiple-valued information source by inputting data of a multiple-valued information source that includes a plurality of bits being divided into bit planes and each bit plane being encoded, and decoding the data into a binary bit series composed of "0"s and "1"s, comprising the steps of:

an input process inputting bit-by-bit a code word, having set either of "0" or "1" of each bit plane as a superior symbol, having set the other of either as an inferior symbol, and having represented by a binary bit series composed of "0"s and "1"s the prediction result having predicted that superior symbol to continue for n units where n is an integer greater than or equal to 1; wherein the superior symbols are decoded in a series of n units when the input code word was a correct prediction, and the superior symbol is newly predicted to continue for a number greater than the n units when correct prediction has continued for a specified number of times.

15. A data decoding method of a multiple-valued information source, comprising the steps of:

an input process inputting bit-by-bit a code word whereby a multiple-valued information source that includes a plurality of bits was divided into bit planes, either of "0" or "1" of each bit plane was set as a superior symbol, the other of either was set as an inferior symbol, and the prediction result having predicted that superior symbol to continue for n units where n is an integer greater than or equal to 1 was represented by a binary bit series composed of "0"s and "1"s; and a prediction result decoding process decoding the superior symbol in a series of n units when the input code word is a correctly predicted value, and inputting the next code word when the input code word is a failed prediction value; wherein a process is recursively iterated whereby the superior symbol is decoded in a series of n-m units when the value of the next code word is a correctly predicted value, the next code word is input again when it is a failed prediction value, and an inferior symbol is decoded during a failed prediction when $0-n<m\leq 1$.

16. A data decoding device of a multiple-valued information source for restoring a multiple-valued information source by inputting a code bit being data of a multiple-valued information source that includes a plurality of bits being divided into bit planes and each bit plane being encoded, and decoding the data into a binary bit series composed of "0"s and "1"s, comprising a prediction bit length equivalent setting and calculating part for setting the superior symbol of the code bit and the n units of the prediction bit length when either of "0" or "1" of each bit plane is set as a superior symbol, and the other of either is set as an inferior symbol; and a decoded bit setting part for temporarily holding a decoded bit in a specified form during input and outputting a decoded bit upon receipt of a decoded bit output permission signal from this prediction bit length equivalent setting and calculating part; wherein, when the input encoded bit is the superior symbol, the decoded bit output permission signal is output and the superior symbol is written into the decoded bit setting part, and when the superior symbol has continued for a specified number of times, the prediction bit length is changed to a number greater than n units.

17. A data decoding device of a multiple-valued information source for inputting bit-by-bit and decoding encoded bits of a multiple-valued information source that includes a plurality of bits being divided into bit planes, either of "0" or "1" of each bit plane being set as a superior symbol, the other of either being set as an inferior symbol, and the prediction result having predicted the superior symbol to continue for n units where n is an integer greater than or equal to 1 as represented by a binary bit series that includes "0"s and "1"s, comprising a prediction bit length/superior symbol setting part for setting a prediction bit length of the encoded bit and the superior symbol;

a prediction bit length calculating part for inputting the prediction bit length and superior symbol from the prediction bit length/superior symbol setting part and outputting a decoded bit output permission signal according to the value of the encoded bit; and a decoded bit setting part for inputting the decoded bit output permission signal, temporarily holding the encoded bit in a specified form during input, and outputting a decoded bit; wherein the superior symbol is written into the decoded bit setting part in a series of n units when the code word input into the prediction bit length calculating part is a correctly predicted value, and the next encoded bit is input when the input code word is a failed prediction, furthermore the superior symbol is written into the decoded bit setting part in a series of n-m units where m is an integer greater than or equal to 1 and less than n when the value is a correctly predicted value, and the next code is again input into the prediction bit length calculating part when it is a failed prediction value.

18. A data encoding method of a multiple-valued information source, comprising the steps of:

a prediction setting process defining either "0" or "1" as a superior symbol and the other as an inferior symbol, when a multiple-valued information source includes a plurality of bits divided into level planes and a binary bit string that includes "0"s and "1"s of each level plane is input, predicting the superior symbol to continue for n units, and setting the n units as a prediction bit number; and a prediction result output process outputting either signal of "0" or "1" as a prediction correct signal, as a code word, when prediction is correct for an observed series composed of the prediction bit number input, and moving to the operation of encoding the next string of n bits, and outputting either "0" or "1" as a prediction failed signal, as a code word, when the prediction has failed in the encoding operation; wherein a similar prediction setting process and prediction result output process are recursively iterated, setting a newly-decreased prediction bit number as a prediction bit number less than n units when the prediction has failed a specified number of times.

19. A data encoding method of a multiple-valued information source, comprising the steps of:

a prediction setting process defining either "0" or "1" as a superior symbol and the other as an inferior symbol, when a multiple-valued information source that includes a plurality of bits is divided into level planes and a binary bit string composed of "0"s and "1"s of each level plane is input, predicting that superior symbol to continue for n units, and setting that n units as a prediction bit number; and a prediction result output process outputting either signal of "0" or "1" as a prediction correct signal, as a code word, when prediction is correct for an observed series that includes the prediction bit number input, and moving to the operation of encoding the next string of n bits, and outputting the other of either "0" or "1" as a prediction failed signal, as a code word, when the prediction has failed in the encoding operation; wherein a similar prediction setting process and prediction result output process are recursively iterated, setting a newly-increased prediction bit number as a prediction bit number more than n units when the prediction was correct for a specified number of times.

20. A data encoding method of a multiple-valued information source, comprising the steps of:

an input process dividing a multiple-valued information source that includes a plurality of bits into level planes, further dividing these level planes into groups such that level planes having concentrated probability are handled independently and those having low probability are compiled as a plurality of level planes, and inputting from the side of the group numbers having concentrated probability when inputting a determining bit string, which includes bits that include "0"s and "1"s and determining whether the multiple-valued information source input pertains to each group number;

a prediction setting process defining either "0" or "1" of the determining bit string of each group as a superior symbol and the other as an inferior symbol, predicting the superior symbol to continue for n units, and setting the n units as a prediction bit number;

a prediction result output process outputting either signal of "0" or "1" as a prediction correct signal, as a code word, when prediction is correct for an observed series which includes the prediction bit number input, and moving to the operation of encoding the next string of n bits, and outputting the other of either "0" or "1" as a prediction failed signal, as a code word, when the prediction has failed in the encoding operation; and a recursive process recursively iterating similar prediction setting process and prediction output process setting a newly-decreased prediction bit number being a prediction bit number less than n units when the prediction has failed a specified number of times; wherein coding of a given input symbol is completed when there is a signal indicating that the determining bit string pertains to a given group, otherwise, the prediction setting process, the prediction result output process, and the recursive processes are executed for the determining bit string of a group having less concentrated probability than the given group.

21. The data encoding method according to claim 20, wherein said n units is made $2^m$ where m is an integer greater than or equal to 0.

22. The data encoding method according to claim 21, further comprising the steps of:

a former-half-correct process halving said observed series when said prediction has failed, outputting "0" as a code word when the former half of the halved observed series is all superior symbols, further halving the latter half of the observed series, and outputting a code word of "0" or "1"; and a former-half-failed process outputting "1" as a code word when there exists said inferior symbol in the former half of the halved observed series, further halving the former half of the observed series, and outputting a code word of "0" or "1"; wherein said former-half-correct process and said former-half-failed process are recursively iterated, repeating division of that observed series as long as there exists an inferior symbol in each divided observed series.

23. A data encoding device of a multiple-valued information source, comprising a prediction bit length equivalent calculating and setting part for dividing a multiple-valued information source including a plurality of bits into level planes, further dividing these level planes into groups such that level planes having concentrated probability are handled independently and those having low probability are compiled as a plurality of level planes, setting either of "0" or "1" of a determining bit string, that includes bits including "0"s and "1"s and determining whether the multiple-valued information source input pertains to each group number, as a superior symbol, setting the other of either as an inferior symbol, predicting that superior bit to continue for n units, and setting that n units as a prediction bit number;

a buffer register for temporarily storing the input bit series; and a determining part for inputting each value of the prediction bit length equivalent calculating and setting part and the buffer register, outputting either signal of "0" or "1" as a prediction correct signal, as a code word, when prediction is correct for an observed series that includes the prediction bit number input, and outputting the other of either "0" or "1" as a prediction failed signal, as a code word, when the prediction has failed in the encoding operation; wherein a newly-decreased prediction bit number that is a prediction bit number less than n units is set by the prediction bit length equivalent calculating and setting part when the prediction has failed a specified number of times, and a newly-increased prediction bit number which is a prediction bit number more than n units is set by the prediction bit length equivalent calculating and setting part when the prediction was correct for a specified number of times.

24. A data encoding device of a multiple-valued information source, comprising:

a buffer register that includes a group of registers for dividing a multiple-valued information source that includes a plurality of bits into level planes, further dividing these level planes into groups such that level planes having concentrated probability are handled independently and those having low probability are compiled as a plurality of level planes, and temporarily storing an input bit series that includes a determining bit string, being constituted by bits consisting of "0"s and "1"s and determining whether the multiple-valued information source input pertains to each group number;

a prediction bit length calculating part installed inside a register for holding a variable, ofs, indicating the leading position of the observed series to encode and a register for holding a variable, width, indicating the prediction bit length;

a determining part for selecting an input bit series on the buffer register determined by the width from the position of the ofs and the ofs on the buffer register output by this prediction bit length calculating part, outputting one superior symbol as a code bit output when that input bit series is all superior symbols, and outputting one inferior symbol when an inferior symbol is included;

an input/output control signal generating part for performing an input bit request when a completion signal indicating that encoding of the input bit series inside the buffer register was completed was received from the prediction bit length calculating part, a stack memory to become a memory for holding the values of the width, which changes moment by moment; and a prediction bit length/superior symbol setting part for inputting the status of the past encoding by the prediction bit length calculating part and setting a prediction bit length and superior symbol of the input bit series newly input; wherein the input/output control signal generating part instructs to acquire an input bit series having a number of units indicated by the new prediction bit length newly set by the prediction bit length/calculation superior symbol setting part when the completion signal was received from the prediction bit length calculating part.

* * * * *